United States Patent
Melnyk et al.

(10) Patent No.: US 12,547,532 B2
(45) Date of Patent: Feb. 10, 2026

(54) CONFIGURATION-BASED SYSTEM AND METHOD FOR HANDLING TRANSIENT DATA IN COMPLEX SYSTEMS

(71) Applicant: Disney Enterprises, Inc., Burbank, CA (US)

(72) Inventors: Andrew Melnyk, Burbank, CA (US); Kyle Baker, Burbank, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 532 days.

(21) Appl. No.: 17/854,375

(22) Filed: Jun. 30, 2022

(65) Prior Publication Data
US 2024/0004785 A1    Jan. 4, 2024

(51) Int. Cl.
G06F 11/3668    (2025.01)
G06F 11/3698    (2025.01)

(52) U.S. Cl.
CPC ...... *G06F 11/3696* (2013.01); *G06F 11/3688* (2013.01); *G06F 11/3698* (2025.01)

(58) Field of Classification Search
CPC .................. G06F 11/36–3696; G06F 11/3698
See application file for complete search history.

(56) References Cited

U.S. PATENT DOCUMENTS

| | | | | |
|---|---|---|---|---|
| 5,561,763 A * | 10/1996 | Eto | .............. | G06F 11/362 |
| | | | | 714/E11.208 |
| 7,383,326 B1 * | 6/2008 | Himberger | .............. | H04L 67/02 |
| | | | | 717/172 |
| 7,809,988 B1 * | 10/2010 | Portal | .............. | G06Q 10/06 |
| | | | | 714/37 |
| 2006/0248066 A1 * | 11/2006 | Brewer | .............. | G06F 16/338 |
| 2014/0282420 A1 * | 9/2014 | Pannem | .............. | G06F 11/3648 |
| | | | | 717/126 |
| 2017/0300402 A1 * | 10/2017 | Hoffner | .............. | G06F 11/3684 |
| 2018/0107589 A1 * | 4/2018 | Sefferman | .............. | G06F 11/3688 |
| 2020/0233790 A1 * | 7/2020 | Battaglia | .............. | H04L 67/02 |

* cited by examiner

*Primary Examiner* — Todd Aguilera
(74) *Attorney, Agent, or Firm* — McCormick, Paulding & Huber PLLC

(57) ABSTRACT

A configuration-based system and method for handling transient data in complex systems includes a method for testing a Host App running on a user device, the Host App communicating with at least one API server using a Host App API Request, the Host App API Request including a Host App API configuration request URL, the Host App API configuration request URL being part of a Host App API Config File, the method includes selectively hydrating the Host App API Config File by selectively replacing at least one of the Host App API configuration request URLs corresponding to a query in a Test Config File with a hydrated Host App API configuration request URL, thereby causing the Host App API Request to route through Test Logic which provides a response to the Host App Request based on desired test behavior defined in the Test Config File.

23 Claims, 21 Drawing Sheets

Original Host App API Config. File Before Hydration (small portion of config.)

⟵ Query/Command 1 ("getCollection") —402

```
"getCollection": {
  "headers": {
    "Accept": "application/json",
    "Authorization": "Bearer {accessToken}",
    "Content-Type": "application/json"
  },
  "href":
```
"https://disney.content.edge.bamgrid.com/svc/content/Collection/{collectionSubType}/version/{apiVersion}/re  ⎫
gion/{region}/audience/k-is-kids,k-is-kidsModeEnabled},l-  ⎬ 404  Original URL
true,maturity/{limitedMaturityRating}/language/{appLanguage}/contentClass/{contentClass}/slug/{slug}",  ⎭
```
  "method": "GET",
  "optionalHeaders": {
    "Accept": "application/json",
    "Authorization": "Bearer {accessToken}",
    "Content-Type": "application/json",
    "X-Content-Transaction-ID": "{contentTransactionId}",
    "X-DELOREAN": "{time}"
  },
  "templated": true,
  "timeout": 15,
  "ttl": 0
},
```

----

⟵ Query/Command 2 ("getCollectionByGroupID") —406  408

```
"getCollectionByGroupId": {
  "headers": {
    "Accept": "application/json",
    "Authorization": "Bearer {accessToken}",
    "Content-Type": "application/json"
  },
  "href":
```
"https://disney.content.edge.bamgrid.com/svc/content/Collection/{collectionSubType}/version/{apiVersion}/re  ⎫
gion/{region}/audience/k-is-kids,k-is-kidsModeEnabled},l-  ⎬  Original URL
true,maturity/{limitedMaturityRating}/language/{appLanguage}/collectionGroupId/{collectionGroupId}",  ⎭
```
  "method": "GET",
  "optionalHeaders": {
    "Accept": "application/json",
    "Authorization": "Bearer {accessToken}",
    "Content-Type": "application/json",
    "X-Content-Transaction-ID": "{contentTransactionId}",
    "X-DELOREAN": "{time}",
    "X-GEO-OVERRIDE": "{country}"
  },
  "templated": true,
  "timeout": 15,
  "ttl": 0
},
```

Other queries/commands in Config. file below - not shown

FIG. 4B

Hydrated Host App API Config. File After Hydration (small portion of config.)

← Query/Command 1 ("getCollection") = Yes Match (Hydrate) — 412

Hydrated URL — 414

← Query/Command 2 ("getCollectionByGroupID") = No Match (No Hydrate) — 416

Not Hydrated URL — 418

Other queries/commands in Config. file below - not shown

CONFIGURATION-BASED SYSTEM AND METHOD FOR HANDLING TRANSIENT DATA IN COMPLEX SYSTEMS

BACKGROUND

Engineers, product development people, design people and company management are all often working in parallel to develop a given complex data-driven software application, typically having various graphic user interfaces (GUI's or U l's), which makes it very difficult to show steady and reliable progress on such application.

This challenge is usually resolved by forming a team dedicated to creating mock data. However, such an approach results in a single point of failure and also slows down the process even further by introducing a single team to own this responsibility.

Engineering teams often work around the standard solution by creating their own mocks or "hardcoding" data as a temporary solution until the "mock" team can finish their work, or they don't progress at all until service teams are ready, which leads to teams reaching milestones at drastically different times, making the planning of large projects unpredictable.

This issue is exacerbated by contributors with different technical backgrounds and business verticals who all want to contribute but do not have the technical knowledge, skills or mechanisms to do so.

Furthermore, the standard solution is usually limited to a 1-to-1 mapping between a particular input and output making it nearly impossible to mock-out a more complex testing experience in an application which will often rely on "n" number of inputs and outputs.

Thus, it would be desirable to have a system and method that allows users of various technical backgrounds to inject and manipulate test data from service testing teams without having to wait for engineers to change their application source code or "mock" service teams to create static data for testing.

BRIEF DESCRIPTION OF THE DRAWINGS

FIG. 4B is a partial code listing, showing a portion of the original Host App API Config. file before hydration occurs, in accordance with embodiments of the present disclosure.

FIG. 4C is a partial code listing, showing a portion of the hydrated Host App API Config. file after hydration occurs, in accordance with embodiments of the present disclosure.

FIG. 13 is a screen illustration showing a response of the Client Host App to a Content Replacement Test by the system and method of the present disclosure, in accordance with embodiments of the present disclosure.

FIG. 16 is a screen illustration showing a response of the Client Host App to a Live Playback in Host App Test performed by the system and method of the present disclosure, in accordance with embodiments of the present disclosure.

DETAILED DESCRIPTION

Figure 1:
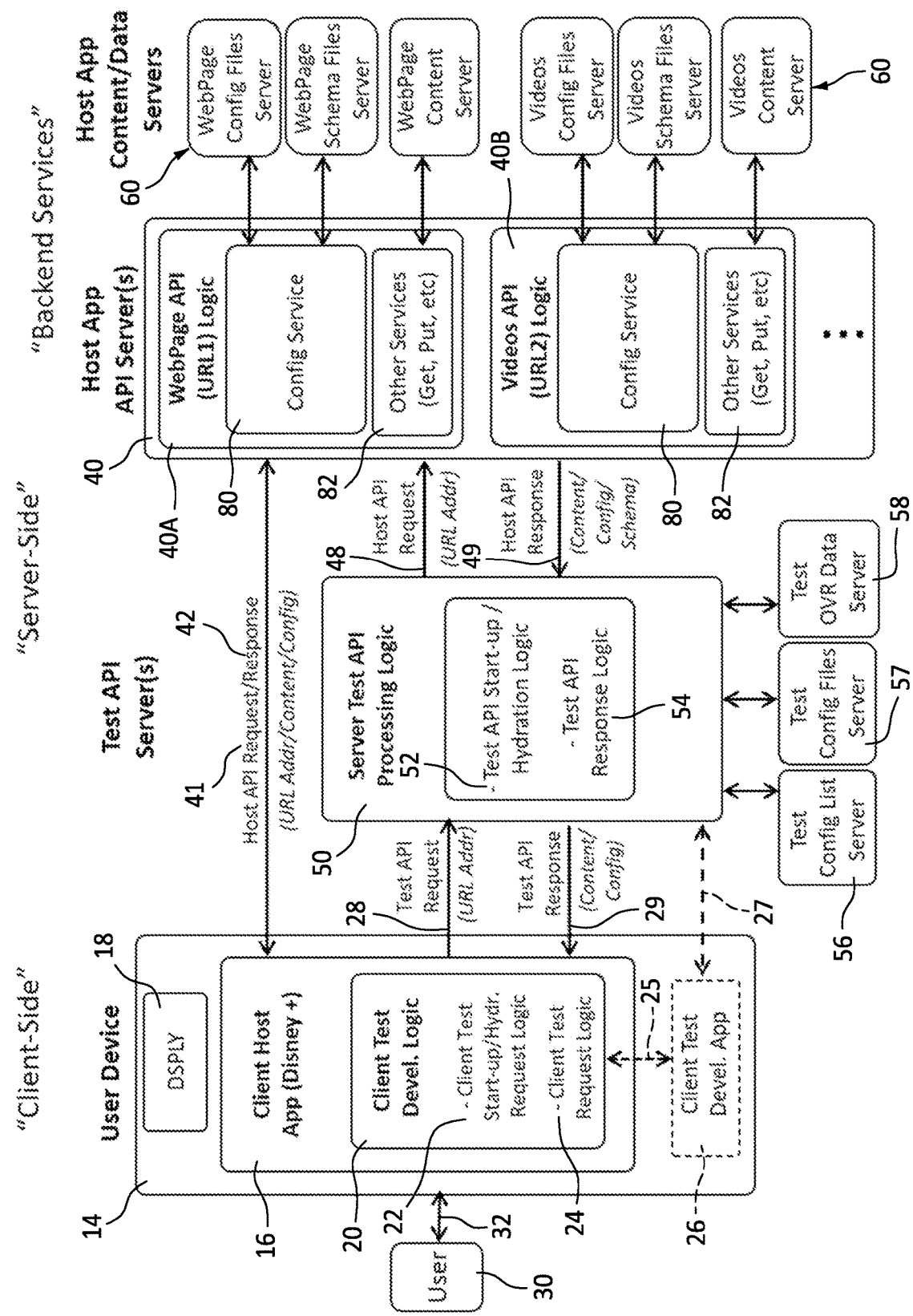
FIG. 1 is a top-level block diagram of components of a configuration-based system and method for handling transient data in complex systems, in accordance with embodiments of the present disclosure.

As discussed in more detail below, in some embodiments, the present disclosure is directed to a configuration-based system and method for handling transient (or test) data in complex systems, which in some embodiments may be used as a method for testing a Host App running on a user device, allows users of various technical backgrounds to inject and manipulate test data from service testing teams in real-time without having to wait to change application source code or to create "mock" static test data for testing purposes. As used herein, the term "Host App" means any software application running on a client device that accesses or communicates with an API (Application Program Interface) or an API server, for obtaining or retrieving data or content for use in the Host App. The retrieved data or content may be presented or displayed directly to a user by the Host App or may affect the content or data being displayed to the user or may affect the look and feel or user experience or performance of the Host App.

In some embodiments, there are one or more predetermined tests that can be selected by a front end developer (FED) or user that can be launched via software logic (Client Test Development Logic), installed in a Client Host App (e.g., Disney+ (or D+) or any other host application or content viewing or streaming application), which enable a developer to evaluate the performance of the system. In particular, in some embodiments, a selected test may inject predetermined mock data in the system so the developer can see how the system responds to such mock data. For example, a test may inject different images to certain parts of the Host App user device display screen. The present disclosure also enables multiple functions of a system to be tested simultaneously.

The system and method of the present disclosure allows a user to select a single test configuration file (Test Configuration or Config. File), such as a JSON file, or the like, which describes the behavior intended to be invoked in the host application being tested, including the data (or override data or mock data) to be used with that behavior. When a request URL "proxies" through the Test logic, the test configuration file will be compared to predetermined unique parts of the request URL and then return (or provide) data back to the client host app in a format prescribed (or set) by the JSON configuration file.

In some embodiments, users can choose a test to be performed, e.g., via a drop-down menu, which determines a backend API service or services, combined with a list of related schemas for that API, to configure (or set up) the "behavior" type of the test project (or test behavior type).

In some embodiments, the test behavior type may comprise one of the following:
(1) a complete replacement of a service response, i.e., an interruption of the flow of the application under test, which returns predetermined static data (from a predetermined memory server) without ever interacting with the "backend service" or backend API Server or API Server (such as Website API or Video API or other or the like), referred to herein as "full" behavior type; or
(2) a partial replacement or modification of a "service response" from a backend service, i.e., using a portion of the response from the "back-end service", referred to herein as "snippet" behavior type; or
(3) one of (1) or (2) above combined with more complex behavior that can be injected in a "proxy layer" between the client and server, such as modifying a user account mid-request, referred to herein as "callback" behavior type.

In some embodiments, the above behavior types may be implemented by the present disclosure as follows:
(1) the client host app makes (or sends or provides) a legitimate or typical Host App API request URL via the client host app to a back-end service, e.g., to get content data for the host app on the user device;
(2) the present disclosure "intercepts" a Request URL and parses the Request URL for "unique identifiers", including the "original" Request URL and a Unique ID to be used by the present disclosure;
(3) the present disclosure fetches the Test Configuration File and uses the Unique ID in the original Host App API Request URL to find a matching query (or command) entry in a test configuration file;
(4) if a matching entry is found in the test configuration file, one of the behaviors above is executed (based on what is in the test config file); and
(5) if a match is not found, the present disclosure "proxies" the original Request URL without modification and the original request is provided to the backend service.

The present disclosure provides an interface for uploading complex user testing flows from an API testing tool such as Postman® (see www.postman.com for more information, the content of which is incorporated herein by reference to the extent needed to understand the present disclosure), Thunder Client (see www.thunderclient.com for more information, the content of which is incorporated herein by reference to the extent needed to understand the present disclosure), or Paw® (see www.paw.cloud for more information, the content of which is incorporated herein by reference to the extent needed to understand the present disclosure), or the like, or manually created API testing configs, which may include unit tests and can be embedded with documentation that describe the complex feature flows. This is beneficial to all stakeholders in the development process because it helps identify relevant parties and design assets.

This solution significantly speeds up and keeps teams aligned through the development process. It also empowers technical and non-technical individuals giving them more input and control over the entire feature development process which improves the communication across teams.

The present disclosure is also inexpensive to operate and involves a static data service and a node application that may run in a cloud hosting service, such as Amazon Web Services (AWS), or any other web hosting service that provides the functions and performance described herein.

In addition, the present disclosure provides a unique simple and easy-to-understand interface, giving control over multiple data points in an application being tested, at runtime.

Moreover, it allows a team to define a test configuration file based on an input schema that maps incoming requests to multiple responses, all of which can have unique behavior based on the reference files.

The present disclosure is different from prior solutions because, typically, the test behavior is limited to proxy tools that can only replace one data point at a time and in a non-scalable fashion, such as Charles (see www.charlesproxy.com for more information, the content of which is incorporated herein by reference to the extent needed to understand the present disclosure), Fiddler® (see www.telerick.com for more information, the content of which is incorporated herein by reference to the extent needed to understand the present disclosure), or other proxy tools. Also, such proxy tools do not have the ability to "react" dynamically in real time to the input test data, they can only exchange one data source for another data source. In other words, prior art systems can only match a request to a response and do not have the ability to behave dynamically as in the present disclosure.

In addition, the system and method of the present disclosure is client agnostic and, thus, any host platform or host application or host app (collectively referred to herein as the Host App) that interacts with a REST-based API backend service may use the present disclosure.

Furthermore, any input data from any host app can be dynamically routed to several back-end services through the same logic, aka the "proxy", and manipulated by the present disclosure before returning to the host app requester.

More specifically, in some embodiments, interacting with the system of the present disclosure may comprise two (2) steps:
(1) retrieving a test config. file (or JSON configuration file) with mappings between original host app API request URLs and the expected/desired test behavior, which may be outlined in the API documentation; and
(2) "hydrating" (or modifying or overwriting or replacing) the original host app API request URL with a modified URL structure to direct the desired requests through the Test Logic framework of the present disclosure. The present disclosure provides an API, which can be combined with the API's schema, to accomplish this step.

Once the client-side Host App API has been "hydrated" with the desired modified URL structure, the rest of the test behavior is determined by the test config. file (or JSON config file). The term "hydrate" as used herein, means modifying or overwriting or replacing at least a portion of a file with data or rules or instructions, including, for example, modifying, overwriting, or replacing a portion of a URL with additional or replacement text string data. The data (or queries or URLs) used by the Test Logic to hydrate the Host App API Config File or the data or instructions used thereby (override or mock data), as described herein, may be referred to herein as transient or temporary data, as Test Logic only temporarily changes (or modifies or overwrites or replaces) such data in the Original Host App API Config File based on and, for the duration of, the test being run or activated. When the test is stopped or the Host App is reset, the Host App defaults back to the Original Host App API Config File.

Referring to FIG. 1, various components (or devices or logic) of a system 10 are shown for a configuration-based system and method for handling transient/test data in complex systems of the present disclosure, which includes a user device 14, such as a smart phone or other computer-based device, having a client-side host software App 16 loaded thereon (e.g., a content viewing or streaming app, such as Disney+ or the like, or a Sports App, such as ESPN App, or any other client host App), the Host App 16 having Client-Side Test Development Logic (Client Test Devel. Logic) 20 installed or inserted therein or thereon, and a display 18, and the user device 14 communicates with a User 30 (or software developer or front end developer or FED), as shown by a line 32. Also, the User 30 (or FED) has installed or inserted the Client Test Devel. Logic 20 into the Host App 16 for the purpose of testing the Host App 16 during development of the Host App 16 or during development of new features of the Host App 16. The Client Test Development Logic 20 interacts with the Client Host App 16 to accomplish the functions described herein, while not altering the normal performance of the Client Host App. In some embodiments, the Client Test Development Logic 20 may have logic therein, such as Client Test Start-up/Hydration Logic 22 and Client Test Request Logic 24, described more hereinafter.

Also, in some embodiments, a portion of the Client Test Development Logic 20 may be located outside the Client Host App as a separate stand-alone App, shown as a Client Test Development App. 26, which may perform some of the functions of the Client Test Development Logic 20. In that case, there may still be some portion of the Client Test Development Logic 20 in the Client Host App 16 that communicates with the Client Host App 16 to enable the performance of the functions described herein and that communicates with the Client Test Development App 26, as shown by a dashed line 25.

The User Device 14 also communicates with one or more Host App API Servers 40, via the Client Host App 20, which sends Host API requests 41 to a Host App API (Application Programming Interface) software or logic, e.g., a REST (REpresentational State Transfer) API, located on the Host App API Servers 40, corresponding to the Host App 16. Other API types may be used if desired. The user device 14 also receives API Responses 42 comprising content (or data) or instructions (or rules or results or response) from the Host App APIs regarding how to interact with the Host App APIs (Host App API call rules), success/failure of the request (e.g., via known codes), and how to access desired content/data (e.g., web address). In particular, for a given Host App 16, there may be separate Host App APIs (or API logics) for different types of information or content, such as WebPage API 40A, Videos API 40B, and the like. The software code for the API's 40A, 40B associated with the Client Host App 16 may be located on a common server or may be on separate servers. Also, each of the Host App APIs may have their own URL address, e.g., URL1 for the WebPage API 40A, URL2 for the Videos API 40B, and the like for other Host App APIs. The Host App API Request is routed to the appropriate Host App API based on the Host App API URL address, which is part of the Host App API Request 41. Also, each Host App API 40A, 40B may provide multiple services (or respond to multiple requests or queries), such as a Configuration Service 80, which provides information or rules for the Host App API calls (or requests or queries) in a Configuration (or Config or JSON) File, and also provides Other Services 82 associated with the Host App API, such as Host App API Request services, e.g., GET, PUT, POST, DELETE, for a REST API, discussed more hereinafter.

In some embodiments, additional or other APIs or Content APIs may be used, such as Media Rights API, Get DNC Video API, Playback API, License API, or any other API that provides the desired function and performance for the desired Test or Test Logic.

In some embodiments, the Host App API Server 40 may be a "distributed" server arrangement (or server bank or server farm or server pool), comprising a plurality of servers (not shown), which may be located in different physical locations, in the same building or different buildings. Such a distributed server allows the APIs to run on a plurality of servers simultaneously, thereby allowing multiple API calls to be handled at the same time from different devices running the same app or different apps that share a common API.

Each of the Host App APIs 40A, 40B communicates with one or more local Content/Data Servers 60, which provides the requested content (or data) to the APIs in response to the Host App API Request 41, for use by the Client Host App 16 as requested by the User 30.

When the User 30 clicks on a link (or image, or icon, or the like) displayed by the Host App 16 on the display (or screen) 18 of the User Device 14, e.g., to view webpage content or watch a video, or the like, the Host App 16 calls the appropriate Host App API with the associated URL, using a Host API Request 41 having the appropriate data in the API request so the appropriate Host App API logic 40A, 40B can obtain the content and deliver it to the Host App 16. In certain cases, e.g., for a webpage request, the WebPage API 40A may return the desired WebPage data and content with the appropriate images and links in the API response 42 to the Client Host App 16. In other cases, e.g., for a video request, the Video API 40B may return a link to the video in the Host API response 42 to the Host App 16, which the Host App 16 can be connected or streamed or downloaded to the device directly from the link provided.

Also, for a given webpage, there may be numerous commands or queries to the WebPage API Logic to obtain the needed content, such as "getcollection" which may provide the top level information for all the rows on a landing page, or "getset", which may provide the images for each row, or "getDmcProgramBundle", which may provide a row of content/images with live data streams. Many other Host API queries (or commands) may be used for a given website display or other user experience.

The Client Test Development Logic 20 communicates with a Server Test API Processing Logic 50, which receives Test API Requests on a line 28 from the Client Test Development Logic 20 and provides Test API Responses on a line 29 to the Client Test Development Logic 20. In some embodiments, the Server Test API Processing Logic 50 may have logic therein, such as Test API Start-up/Hydration Logic 52 and API Test Response Logic 54, described more hereinafter. Also, in the case where there is the Client Test Development App 26, the App 26 may also communicate with the Server Test API Processing Logic 50 as shown by a dashed line 27.

The Server Test API Processing Logic 50 also communicates with various servers, such as Test ConFIG. List Server 56, Test Config. Files Server 57, Test Override Data Files Server 58, which provide data or files or software used by the Server Test API Processing Logic 50. In particular, the Server API Processing Logic 50 communicates with a Test ConFIG. List Server 56, Test Config. Files Server 57, Test Override Data Files Server 58, as discussed more hereinafter. Other servers may be used if desired.

The Server Test API Processing Logic 50 also communicates with the one or more Host App API Servers 40, by sending Host API requests on a line 48 to the Host App API Logics 40A, 40B, and receiving responses on a line 49 from the Host API Logics 40A, 40B. Other API types may be used if desired.

The present disclosure provides a system and method that enables testing of a given Client Host App by selectively and seamlessly interrupting the normal flow of requests between the Client Host App and the Host App APIs to inject predetermined test/mock data and various test behaviors into the normal operating system.

The Client-Side Test Development Logic (or Client Test Devel. Logic) 20 and the Server-Side Test API Processing Logic (or Server Test API Processing Logic) 50 may be individually or collectively referred to herein as Test Logic.

Figure 2:
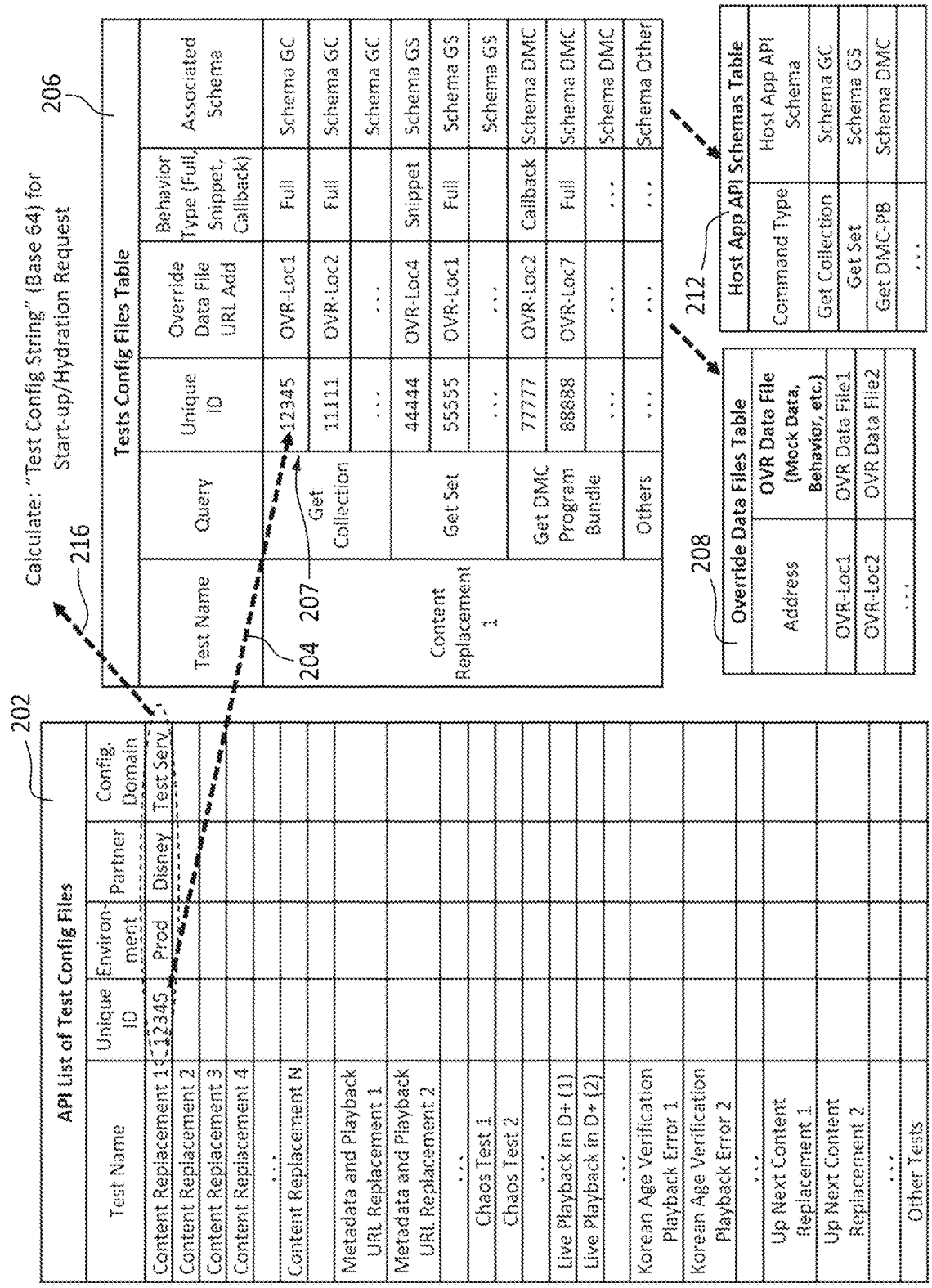
FIG. 2 is an illustration showing several tables, including an API List of Test Config Files, Test Config Files Table, Override Data Files Table and Host App Schemas Table, and how the Client Test Development Logic and the Server Test API Processing Logic shown in FIG. 1 uses the tables, in accordance with embodiments of the present disclosure.

Referring to FIG. 2, an illustration showing several tables are shown, including an API List of Test Config Files 202, Test Config Files Table 206, Override Data Files Table 208 and Host App Schemas Table 212, and how the Client Test Development Logic 20 and the Server Test API Processing Logic 50 shown in FIG. 1 uses the tables 202.206.208.212, in accordance with embodiments of the present disclosure. In particular, when the user selects a test to run, it is selected from an API List of Test Config. files table 202. Each test has a Test Name, Unique ID, Environment (e.g., production or any other environment), Partner (e.g., Disney, Star, or other partners), and may also have Config. Domain data, which defines where to find the mock or override data. These 4 parameters are combined to calculate a base 64 string, called a Test Config String as shown by a dashed line 216, which is used as part of a Test API Request called the Start-up/Hydration Request, discussed hereinafter. In particular, in order to fit the required data associated with the Test configuration options into a fixed position in a URL path, the data is encoded into a base64 string to create the Test Config String. When the Test Config String is received by the Test Processing Logic in the Start-up/Hydration Request, it is decoded to identify the Unique ID, which uniquely determines the corresponding Test Config file 207 from the Tests Config. Files Table 206, as shown by a dashed line 204, e.g., 12345 in the example shown in FIG. 2. Once the Test Config file 207 is identified within the Tests Config. Files Table 206, the Tests Config. Files Table 206 provides the Query/Command associated with the Unique ID, e.g., "GetCollection" in the example shown in FIG. 2. The Query/Command is used during Start-up to hydrate the Host API Config file and also used during normal test operation when parsing incoming requests (discussed more hereinafter). The Tests Config. Files Table 206 also provides an Override Data File URL address and a Behavior Type associated with this particular Query/Command (e.g., OVR-Loc1 and Full, respectively, in the example shown in FIG. 2). In particular, in this example, OVR-Loc1 is the address of the override data file, which provides the mock data and instructions/behavior to be performed, and Full is the behavior type. The Tests Config. Files Table 206 also provides the Schema associated with this particular Query/Command to use the proper syntax and related rules for properly communicating with the Host App API, it also provides the necessary information to correctly parse an incoming Request URL from the Client Host App.

Figure 3:
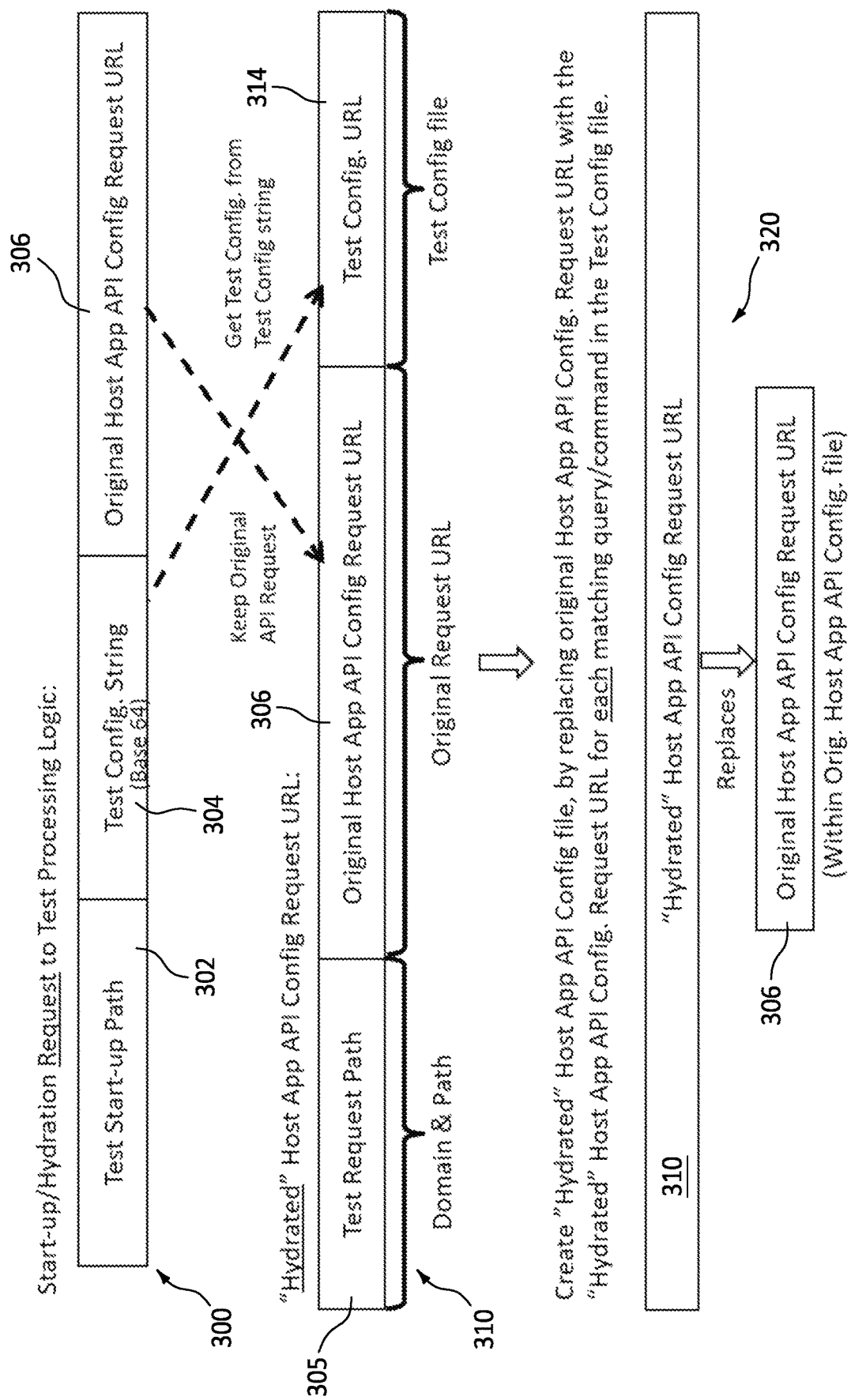
FIG. 3 is an illustration of the data formats for the Start-up/Hydration Request and the response with the hydrated URL/Test Config file, in accordance with embodiments of the present disclosure.

Referring to FIG. 3, an illustration of the data formats for the Start-up/Hydration Request and the Hydrated Host App API Config Request URL is shown, in accordance with embodiments of the present disclosure. In particular, when the user selects a test to run, the Client Test Devel. Logic 16 sends a Client Start-up/Hydration Request 300 to the Server Test API Processing Logic 50 as a Test API Request (FIG. 1). The composition of the Client Start-up/Hydration Request 300 may comprise three parts: a Test Start-up Path (domain and path) 302, a TestTest Config String (base 64) 304, and an original Host App API Config Request URL 306. In response to the Startup/Hydration Request, the Server Test API Processing Logic 50 creates a Hydrated Host App API Config Request URL, which may comprise three parts: Test Request Path (domain and path) 305, the original Host App API Config Request URL 306, a Test Config. file URL 314. The Hydrated Host App API Config Request URL is used to selectively replace the Original Host App API Config Request URL in the Original Host App API Config. file to create a Hydrated Host App API Config File, as shown by the illustration 320 on the bottom of FIG. 3.

Figure 4A:
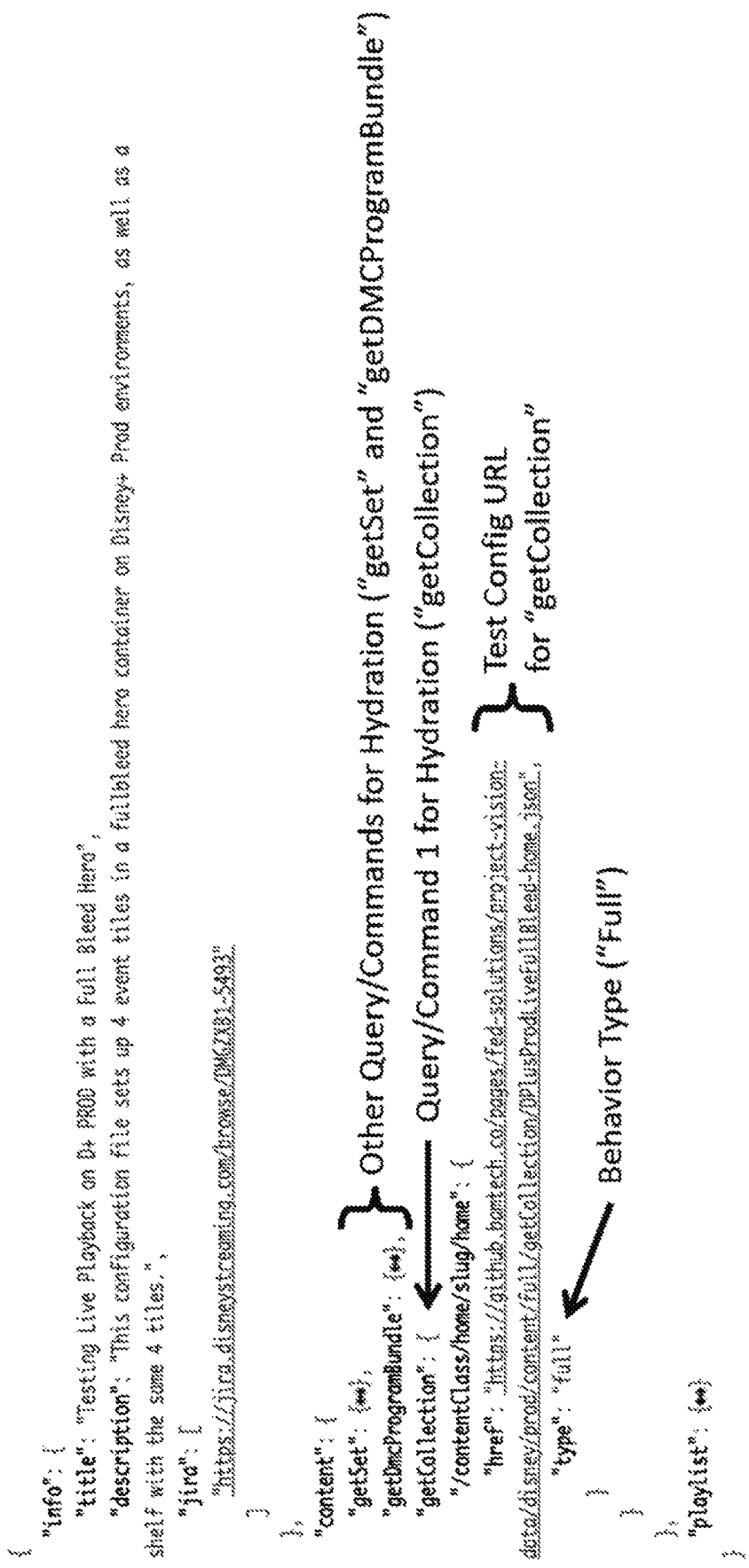
FIG. 4A is a partial code listing, showing a portion of the Test Config file that hydrates the Host App API Config file, in accordance with embodiments of the present disclosure.

Referring to FIG. 4A, a partial code listing is shown, which shows a portion of the Test Config file that hydrates the Host App API Config file, in accordance with embodiments of the present disclosure. In particular, three queries are shown: "getSet", "getDmcProgamBundle", and "getcollection", and the specific URL for the TestTest Config file that selectively hydrates the Host App API Config file for the query "getcollection". In that example, the domain and path shown is for the Test Config. file for the query "getcollection".

Referring to FIG. 4B, a partial code listing is shown, which shows a portion of the original Host App API Config. file before hydration occurs, in accordance with embodiments of the present disclosure. In particular, the small portion of code screenshot shows two Query/Commands having two original "endpoints". The first Query/Command (Query/Command 1) is "getcollection" 402, and the associated original URL 404 portion of the Host App API Config file before hydration. The second Query/Command (Query/Command 2) is "getCollectionByGroupID" 406, and the associated original URL 408 portion of the Host App API Config file before hydration.

Referring to FIG. 4C, a partial code listing is shown, which shows a portion of the hydrated Host App API Config. file after selective hydration occurs, in accordance with embodiments of the present disclosure. In particular, the small portion of code screenshot shows the same two Query/Commands (with associated "endpoints") as in FIG. 4B. The first Query/Command (Query/Command 1) is "getCollection" 412, which matches a query that was in the Test API Request, and thus hydration will occur for that query, and the hydrated URL is shown as numeral 414, having a format similar to the Hydrated Host App API Config Request URL 310 of FIG. 3, which is a new endpoint that replaces the original URL endpoint. The second Query/Command (Query/Command 2) is "getCollectionByGroupID" 416, which does NOT match a query that was in the Test API Request, and thus hydration will NOT occur for that query, and the non-hydrated URL is shown as numeral 418, which does not result in a change to the original URL and thus the endpoint has not changed for this query. Thus, the system of the present disclosure selectively hydrates the Hydrated Host App API Config file, as shown further with FIG. 9B.

Figure 5:
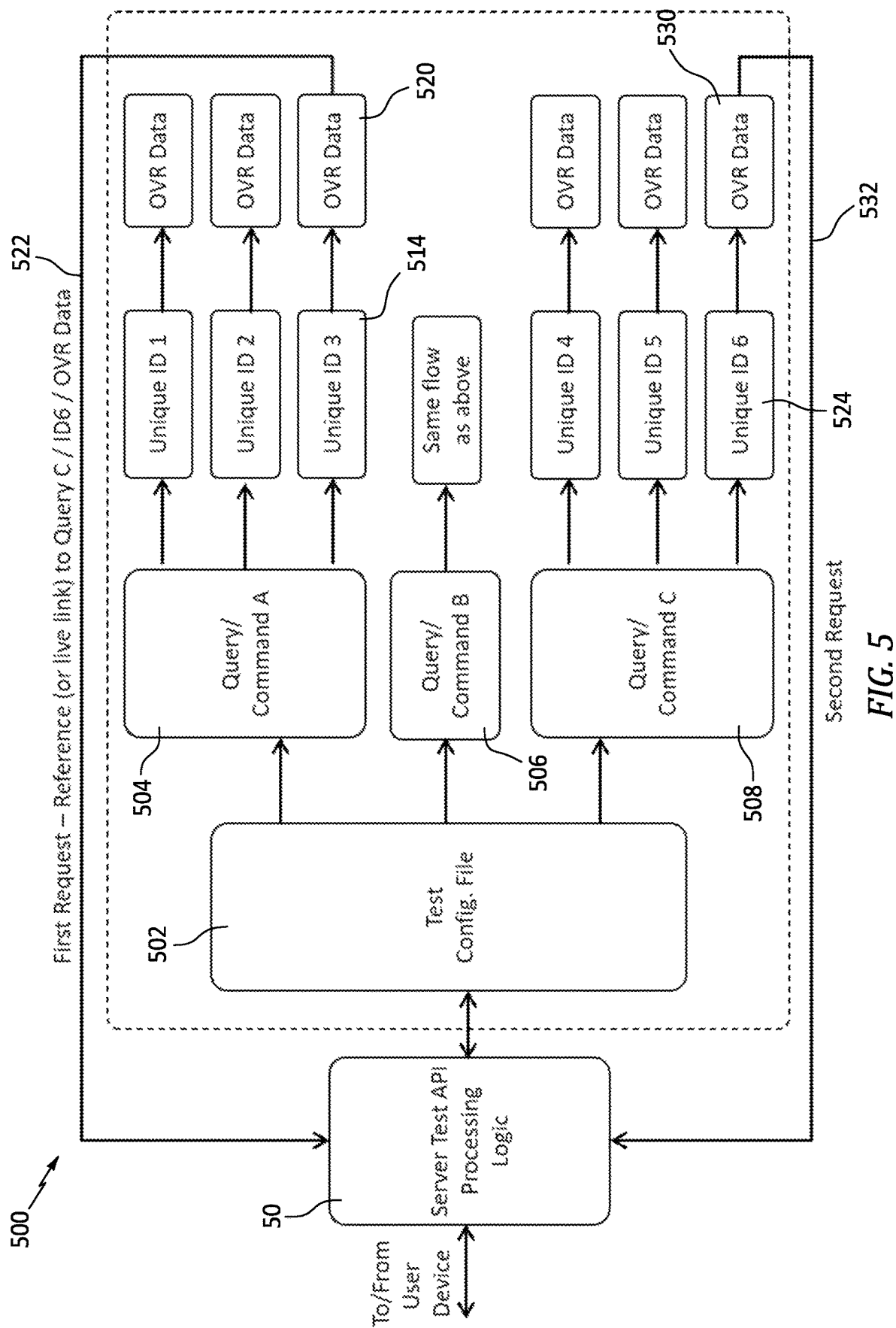
FIG. 5 is a data flow diagram showing one embodiment of how the Server Test API Processing Logic and the Test Config File can be used to create multi-level or nested test arrangements, in accordance with embodiments of the present disclosure.

Referring to FIG. 5, a data flow diagram 500 is shown, which shows one embodiment of how the Server Test API Processing Logic of FIG. 1 and the Test Config File of FIG. 2 can be used to create multi-level or nested test arrangements or actions, or a nested relationship between multiple nodes in a Test Config. file, causing the Hydrated Host App Config File, and thus the Host App, to perform nested actions, in accordance with embodiments of the present disclosure. In particular, the Server Test API Processing Logic 50 identifies the Test Config File 502, as discussed herein, which may have several Queries/Commands associated with it, such as Queries/Command A 504, Queries/Command B 506, Queries/Command C 508, and each of the Queries/Commands has one or more Unique IDs, such as Unique ID 1, Unique ID 2, Unique ID 3, and each of the Unique ID has an associated OVR Data file and behavior type associated with it, as discussed with FIG. 2. In this example, a first request 522 is made, which follows a path of Query/Command A 504, Unique ID 3 514, and OVR Data 520, which has associated override/mock data, which may also have a reference or live link. In this case, the live link may be a link to Query Command C, Unique ID 6, and its associated OVR data as shown by line 522. Thus, the next time through the logic 50, if the user selects the data that was supplied by the prior OVR data 520, it will follow a path of Query Command C 508, Unique ID 6 524, and its associated OVR data 530, where a second request 532 can be created by the OVR data 530, if desired. If that occurs, a further nesting or multiple levels set up can be performed using the present disclosure, which provides significant flexibility and power from a testing perspective. More specifically, the "first request" 522 is a series of relevant requests from the Host App that routes through the Test Processing Logic. In this case, the first request 522 will return data where at least one data point will contain a URL to be used in a second request 532. This nested relationship is what enables the Test Processing Logic 50 and Test Development Logic 20 (collectively the Test Logic to mock-up chains of requests through a complex request flow. The "second request" 532 is a request made using a URL from the data returned in the first request 522. In some cases, it may not have been made immediately after the first request. For example, if a test display option is created by a first hydrated URL for a given query, which causes the test display option to be shown, and it has an action button on it, the user could click on that action button and the system can offer another level of different content or action, and these types of recursive or nested actions may continue for further nested actions without any structural limits.

Below is an example of the request flow using with the Host App:

(1) The user navigates to the homepage of Host App, e.g., a streaming app such as Disney+ (www.disneyplus.com), or any other content streaming or viewing app;

(2) A series of requests are made by the Host App, some or all of which route through the Test Processing Logic (or Test Logic), to generate the homepage User Interface (UI) for the Host App, one of which is the "first request" 522 shown in the FIG. 5;

(3) The user then clicks on a "continue watching" tile or button on the homepage, which would normally invoke playback of the selected video;

(4) When invoking playback, the Host App code uses a URL from the data stored within the local Host App memory from the "first request";

(5) The video player makes a request ("second request" 532 ) to the URL which routes through Test Processing Logic; and Test Processing Logic intercepts the "second request" and instead of returning the metadata necessary to play the normal video that Host App users would expect, it returns video metadata that plays, e.g., a mock live or test stream.

Figure 6:
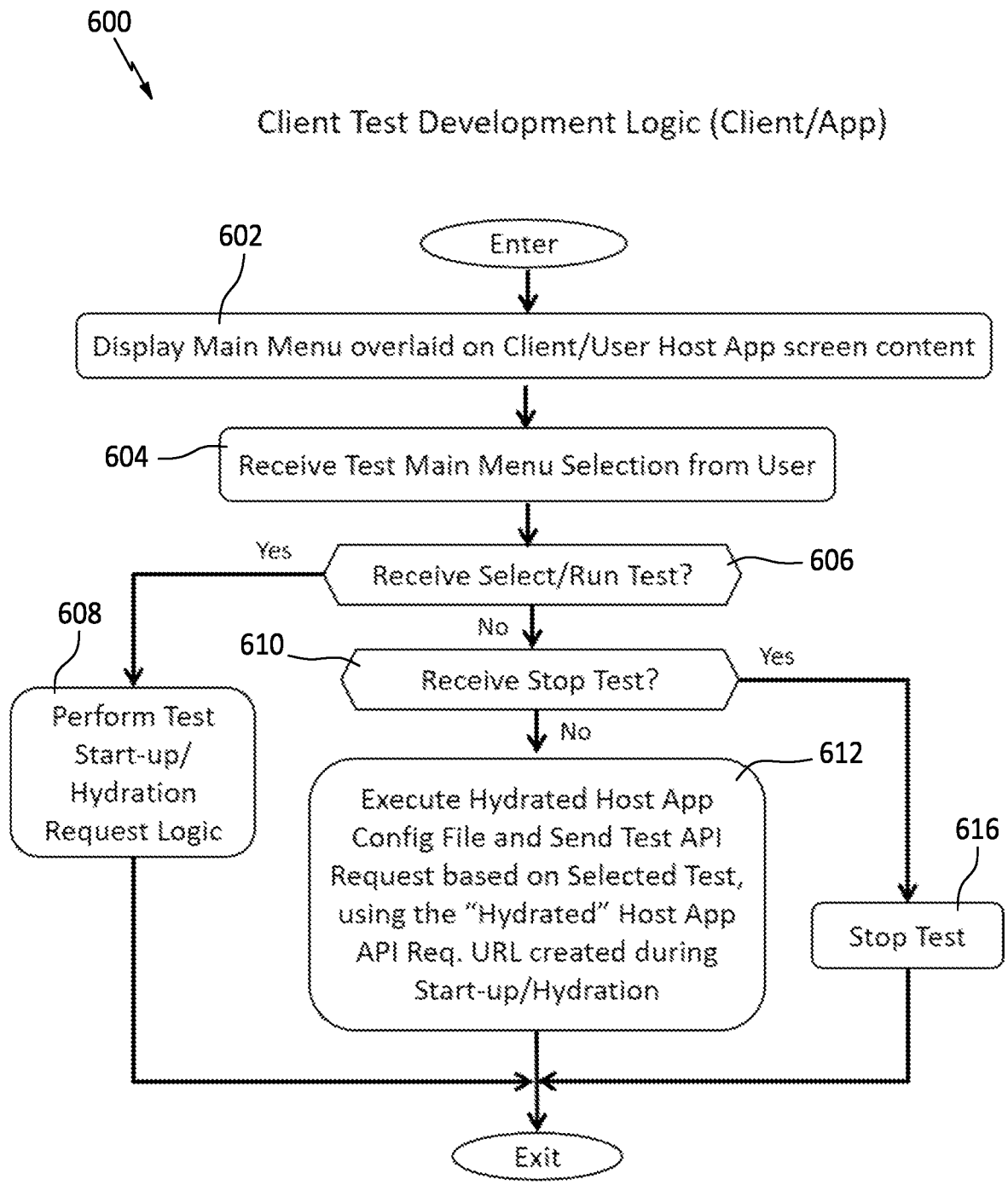
FIG. 6 is a flow diagram of one embodiment of a Menu Selection Logic within the Client Test Development Logic of FIG. 1, in accordance with embodiments of the present disclosure.

Referring to FIG. 6, a flow diagram 600 illustrates one embodiment of a process or logic for implementing the Client Test Development Logic 20 (FIG. 1). The process 600 begins at block 602, which displays the main menu, see FIG. 12 Test Action menu 1204. Next, block 604 receives Test Main Menu Selection from the User. Next, block 606 determines if the Select/Activate Test in box 1204 (FIG. 12) was received. If Yes, block 608 performs Client Test Start-up Hydration Request Logic 22 (Client/App) (FIG. 7) discussed hereinafter and the logic 600 exits. In some embodiments, once the Host App Config File has been "Hydrated" or modified (as described herein), the selected test 1206 (FIG. 12) has effectively been "activated" because the Host App uses the Host App Config File to perform or retrieve any Host App user requests (e.g., load a webpage, watch a video, and the like). If the result of block 606 is NO, block 610 determines if a Stop Test (or End Test) in box 1204 (FIG. 12) selection was received. If a Stop Test (or End Test) in box 1204 (FIG. 12) was not received, block 612 executes Hydrated Host App Config File and sends the Test API Request based on the Selected Test 1206 (FIG. 12), using the Hydrated Host App API Req. URL created during the Start-up/Hydration and the logic exits. In some embodiments, executing the Hydrated Host App Config File and sending the Test API Request (block 612) may be performed by the Host App, e.g., in response to a Host App user request. If the result of block 610 is Yes, a Stop Test (or End Test) in box 1204 (FIG. 12) was received and block 616 stops performance of a Test that may be progress, and the logic exits. In some embodiments, stopping the Test may comprise restarting (or rebooting) the Host App, which will cause the Original Host API Config. file to be reloaded from local memory. In some embodiments, receiving a Stop Test (or End Test) in box 1204 (FIG. 12) will cause Test API Processing logic to set a Stop Test Flag which may cause the Test API processing logic 50 to pass through the Test API Request from the Hydrated Host API Config file to the backend service without alteration and return a response from the backend service without alteration, similar to what the logic does for a query within the Hydrated Host Config API file that is not part of the current running/activated Test.

Figure 12:
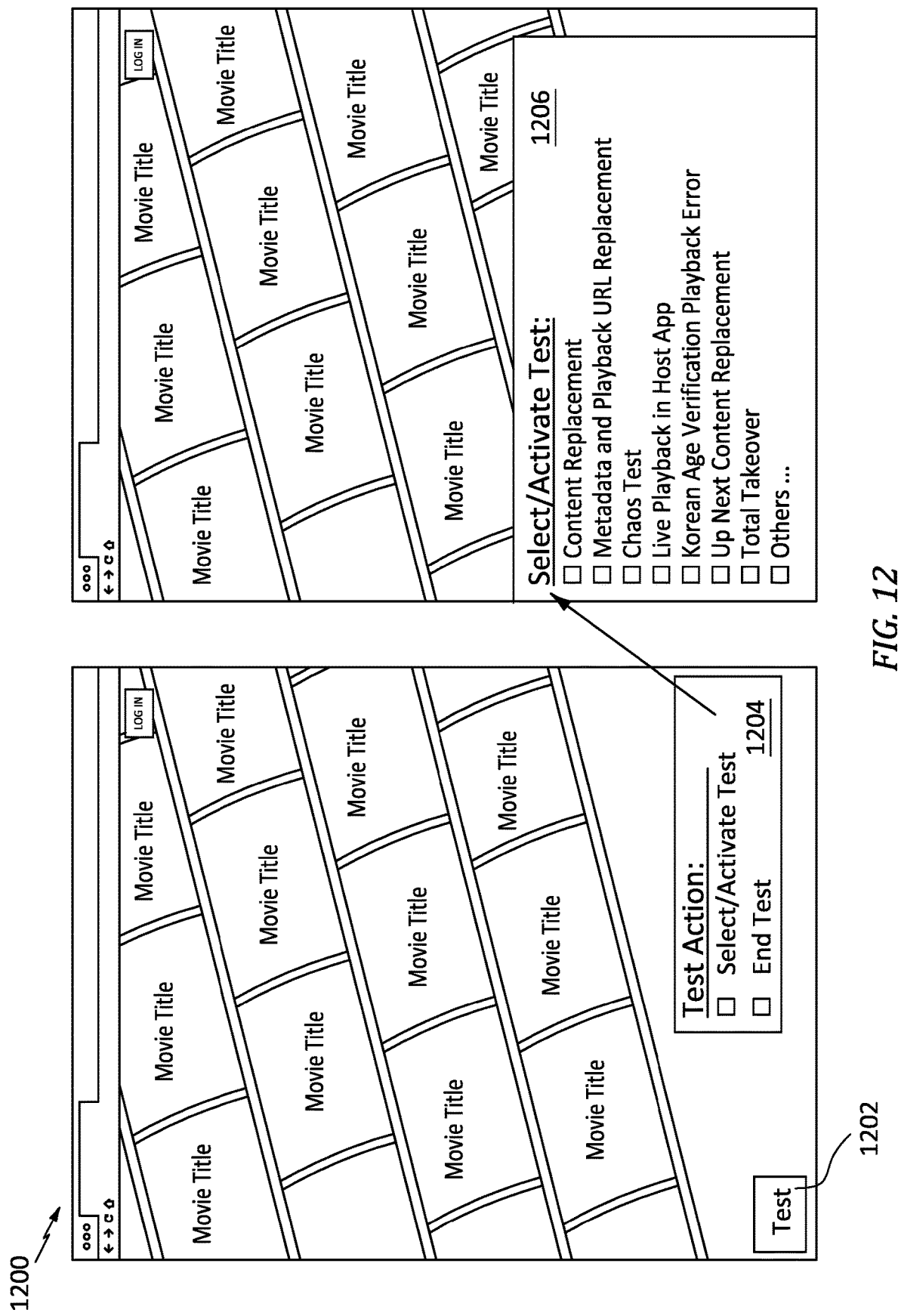
FIG. 12 is a screen illustration of a graphic user interface overlaid on a Client Host App user interface which is under test by the system and method of the present disclosure, in accordance with embodiments of the present disclosure.

FIG. 12 is a screen illustration of a graphic user interface 1202, 1204, 1206 overlaid on a Client Host App user interface 1200 which is under test by the system and method of the present disclosure, in accordance with embodiments of the present disclosure.

Figure 7:
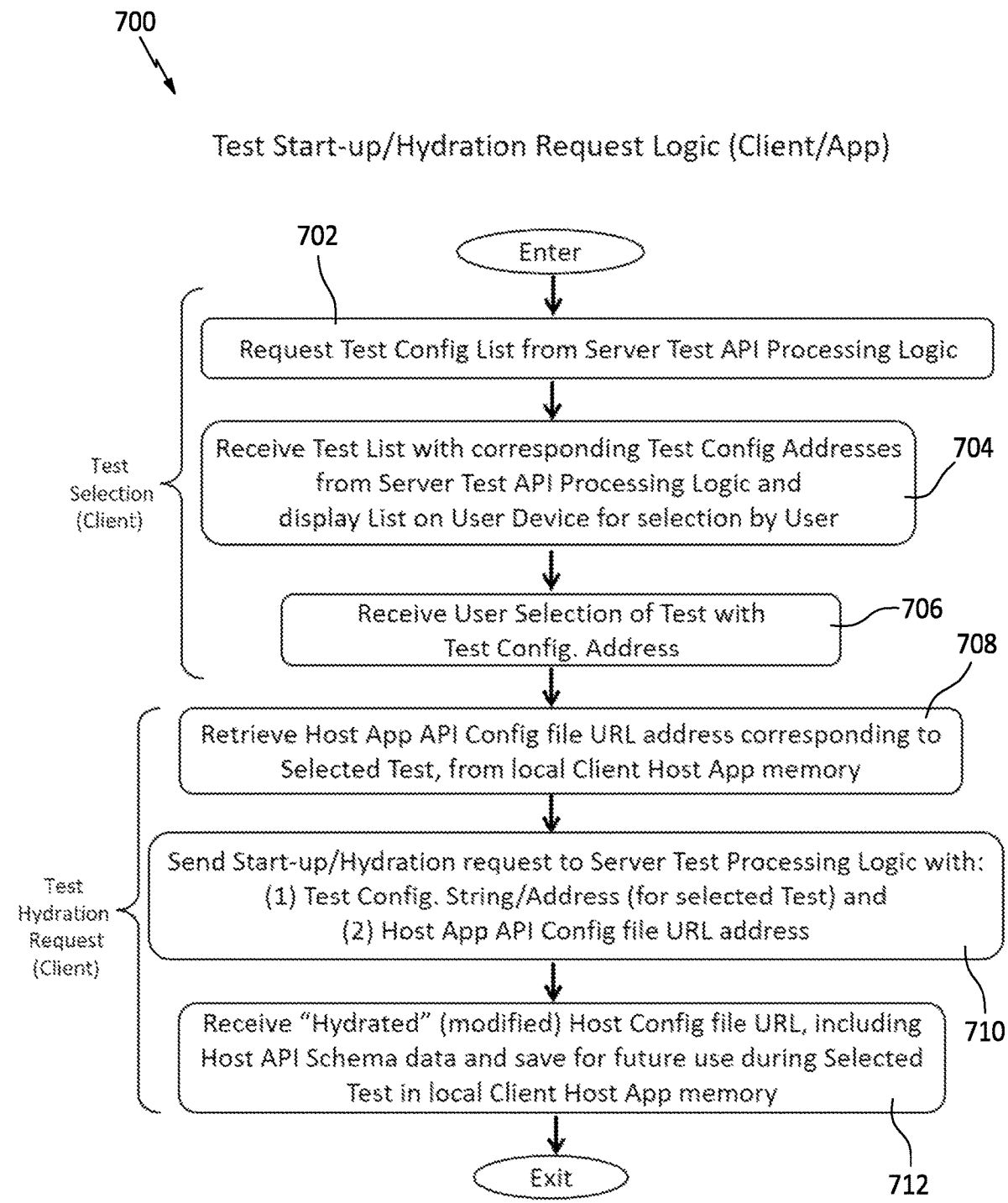
FIG. 7 is a flow diagram of one embodiment of a Test Start-up/Hydration Request Logic within the Client Test Development Logic of FIG. 1, in accordance with embodiments of the present disclosure.

Referring to FIG. 7, a flow diagram 700 illustrates one embodiment of a process or logic for implementing the Test Start-up/Hydration Request Logic 22 (FIG. 1) within the Client Test Development Logic 20 (FIG. 1). The process 700 begins at block 702, which requests the Test ConFIG. List from the Server Test API Processing Logic 50. Next, block 704 receives Test List with corresponding Test Config Addresses 202 (FIG. 2) from the Server Test API Processing Logic 50, for each of the available Tests. Next, block 706 receives the user selection of the Test with Test Config. Address, e.g., Content Replacement 1, Get Collection, Unique ID 12345 (FIG. 2). Next, block 708 retrieves the original host App API Config file URL address corresponding to the Selected Test, from local Client Host App memory. Next, block 710 sends the Start-up/Hydration Request 300 (FIG. 3) to the Server Test Processing Logic 50 including: (1) the Test Config. String (base 64) for the selected test and (2) the original Host App API Config file URL address. Next, block 712 receives the hydrated (modified) version of the Host Config file URL, including the Host API Schema, called the Hydrated Host API Config file and saves it in local Client Device memory (or other storage area/device/server) for future use during the selected Test.

Figure 8:
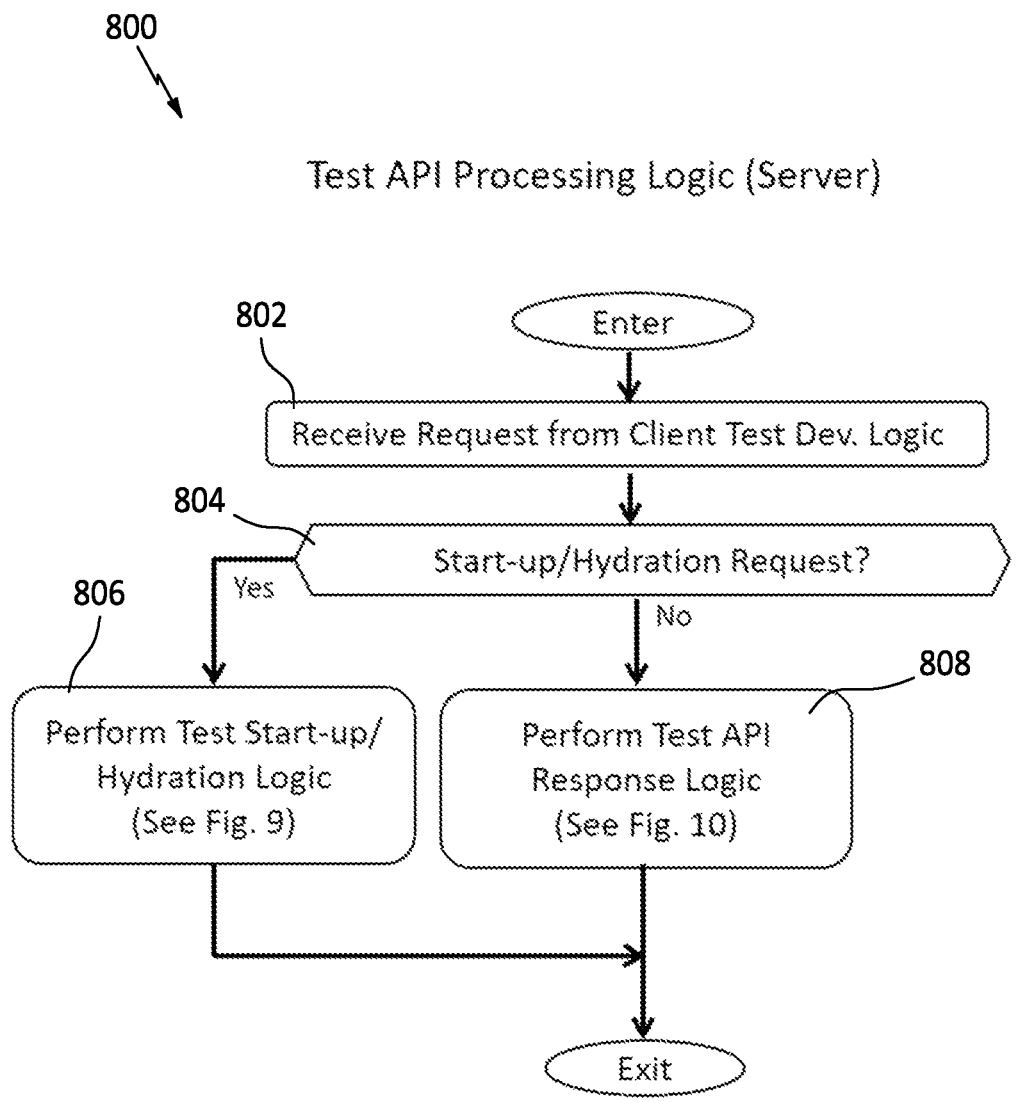
FIG. 8 is a flow diagram of one embodiment of the Test API Processing Logic of FIG. 1, in accordance with embodiments of the present disclosure.

Referring to FIG. 8, a flow diagram 800 illustrates one embodiment of a process or logic for implementing the Server Test API Processing Logic 50 (FIG. 1). The process 800 begins at block 802, which receives a request from the Client Test Development Logic 20. Next, block 804 determines if a Start-up Hydration Request has been received. If Yes, block 806 performs Test Start-up/Hydration Logic (see FIG. 9, discussed below) and then the logic exits. If the result of block 804 is NO, a Client Test Request has been received and block 808 performs Test API Response Logic (see FIG. 10, discussed below), and then the logic exits.

Figure 9A:
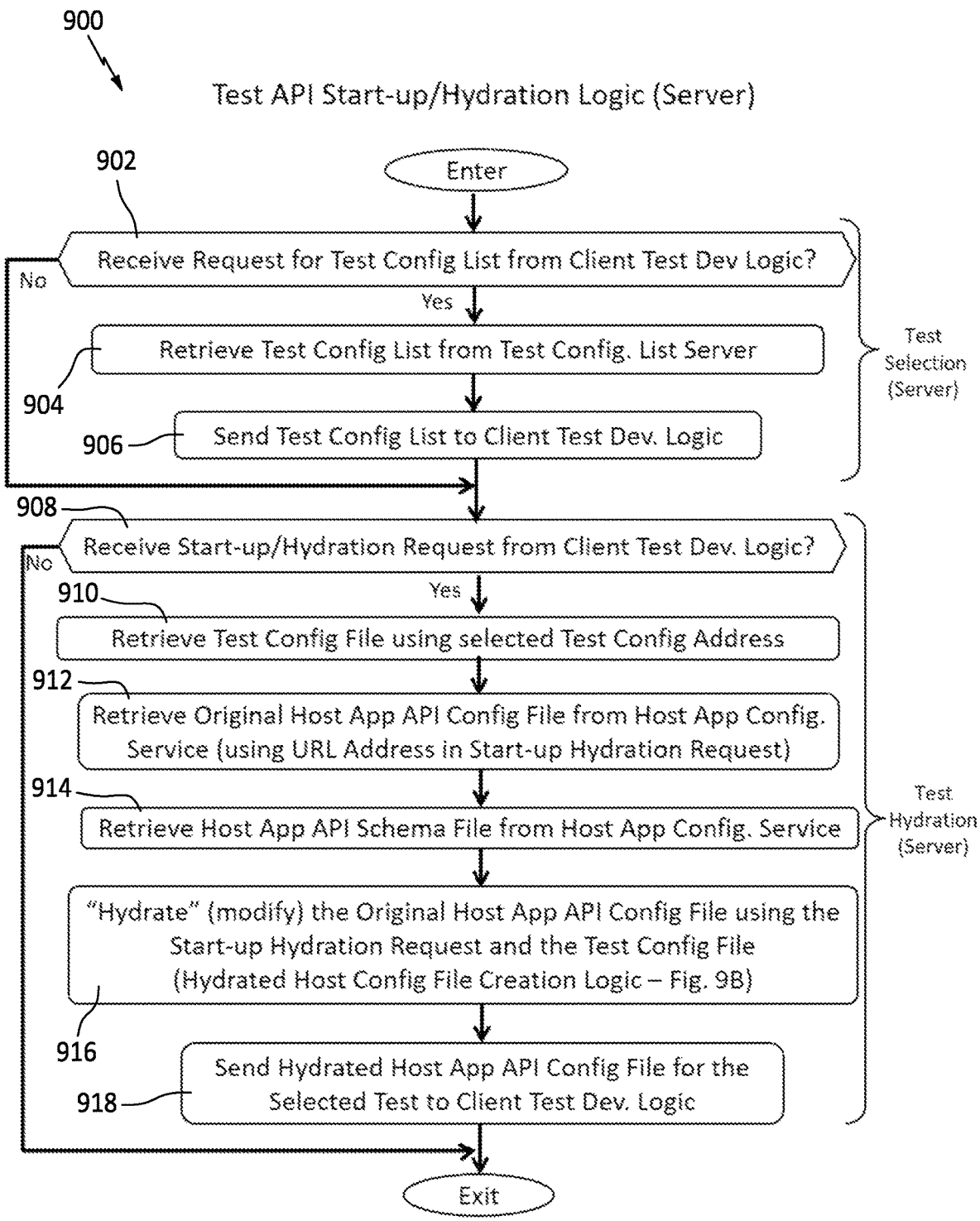
FIG. 9A is a flow diagram of one embodiment of a Test API Start-up/Hydration Logic within the Test API Processing Logic of FIG. 1, in accordance with embodiments of the present disclosure.
Figure 9B:
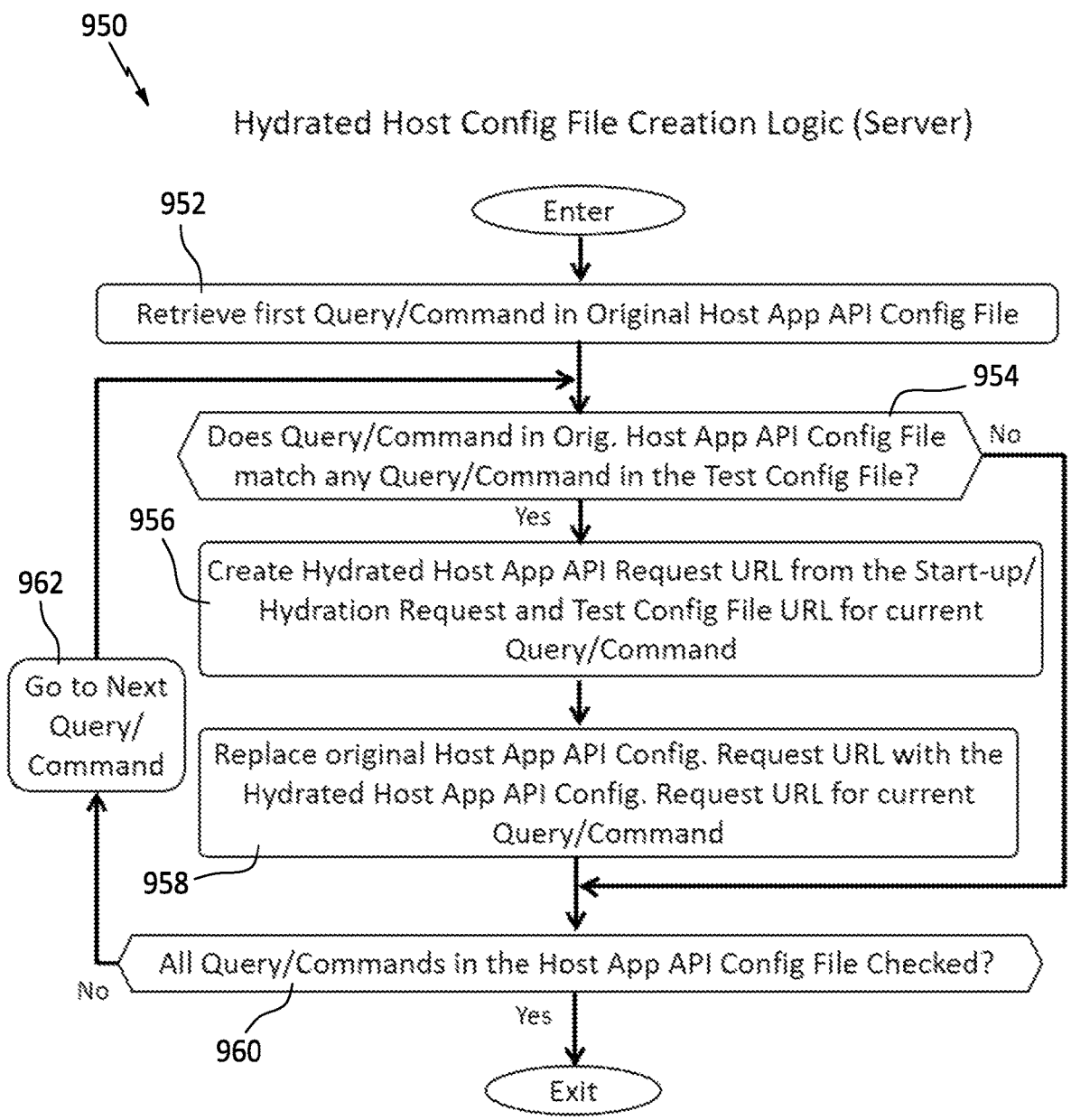
FIG. 9B is a flow diagram of one embodiment of a Hydrated Host Config File Creation Logic within the Test API Processing Logic of FIG. 1, in accordance with embodiments of the present disclosure.

Referring to FIG. 9A, a flow diagram 900 illustrates one embodiment of a process or logic for implementing the Test API Start-up/Hydration Logic 52 (FIG. 1). The process 900 begins at block 902, which determines if a request for Test ConFIG. List from Client Test Develop. Logic 20 has been received. If Yes, block 904 retrieves the Test ConFIG. List from the Test ConFIG. List Server 56 (FIG. 1). Next, block 906 sends the Test ConFIG. List to the Client Test Develop. Logic 20. Next, or if the result from block 902 is NO, block 908 determines if a Start-up Hydration Request was received from the Client Test Develop. Logic 20. If NO, the logic exits. If Yes, block 910 retrieves the Test Config File using the selected Test Config Address. Next, block 912 retrieves the Host App API Config file from the Host App Config Service (using the URL Address in Start-up Hydration Request). Next, block 914 retrieves the Host App API Schema File from the Host App Config. Service. Next, block 916 "hydrates" (modifies) the Original Host App API Config File using the Start-up Hydration Request and the Test Config File. Next, block 918 sends the Hydrated Host App API Config File for the selected test to the Client Test Develop Logic 20 and the logic exits. In some embodiments, the Original Host App API Config File may simply be overwritten by the Hydrated Host App API Config File in a storage location that is accessible by both the Client Host App 16 or the Client Test Development Logic 20 and the Server Test API Processing Logic 50 (FIG. 1). In that case, there may only be one Hydrated Host App API Config File which changes its contents or API Config URL links based on whether Testing is turned active (or turned on) or based on what Test is being performed.

Figure 10:
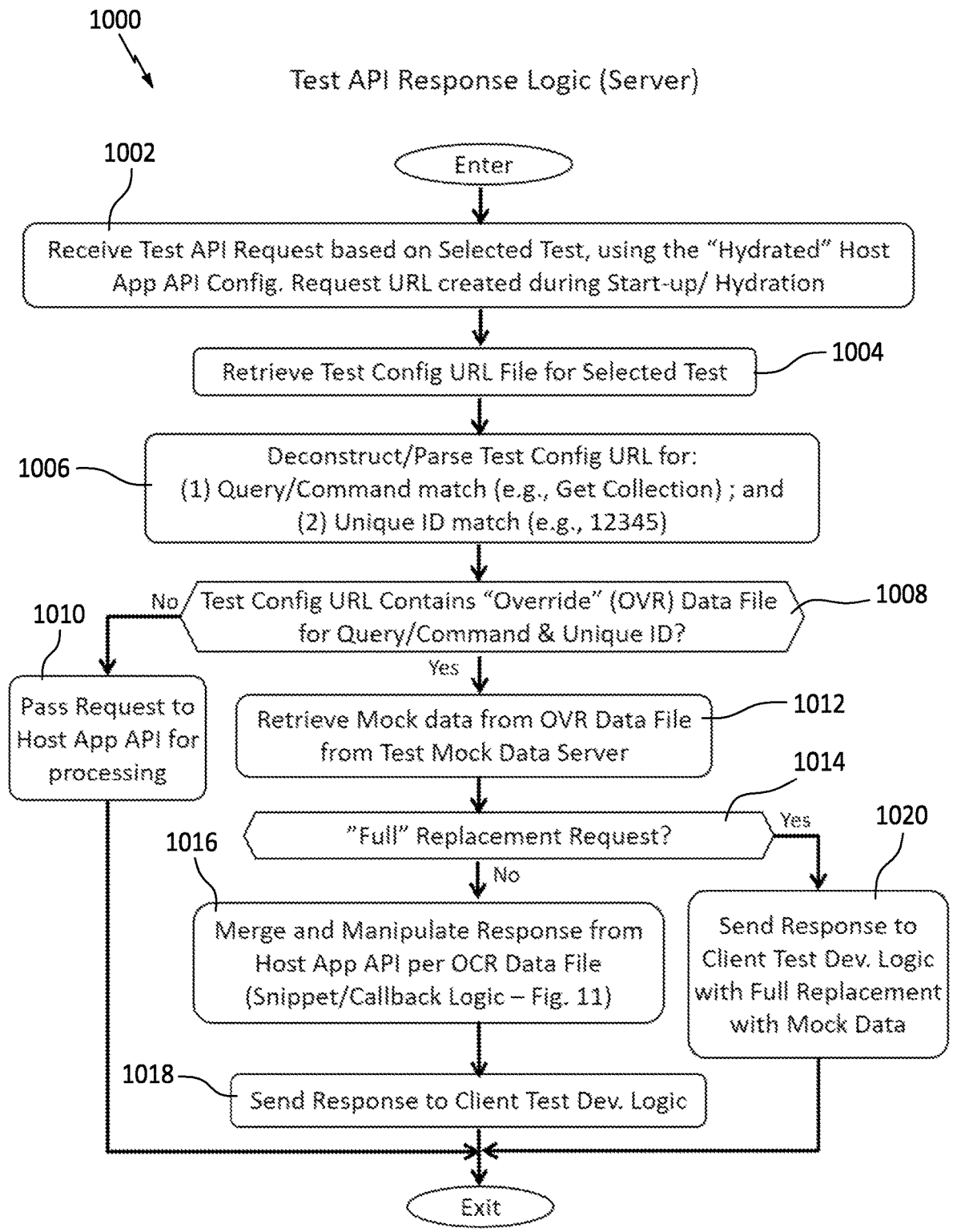
FIG. 10 is a flow diagram of one embodiment of a Test API Response Logic within the Test API Processing Logic of FIG. 1, in accordance with embodiments of the present disclosure.

Referring to FIG. 10, a flow diagram 1000 illustrates one embodiment of a process or logic for implementing the Test API Response Logic within the Test API Processing Logic (FIG. 1). The process 1000 begins at block 1002, which receives a Test API Request bests on the selected Test, using the Hydrated URL created during the Start-up/Hydration. Next, block 1004 retrieves the Test Config URL file for the selected test. Next, block 1006 deconstructs/parses the Test Config URL for: (1) query match (e.g., "getcollection"); and (2) Unique ID match (e.g., 12345). Next, block 1008 determines whether the Test Config URL contains "override" (OVR) Data file for the corresponding Query/Command and Unique ID (also see FIG. 2, table 206 and table 208). If NO, block 1010 passes the request directly to the Host App API for processing, and the logic exits. If the result of block 1008 is Yes, an Override Data File exists and block 1012 retrieves the Mock data from the OVR Data file from the Test Override (OCR) Data Server. Next, block 1014 determines if this is a "Full" replacement request. If Yes, block 1020 sends response to Client Test Develop Logic 20 with full replacement with Mock Data. In particular, for the "Full" behavior type, the request process is interrupted and the mock data from the override data file is returned directly to the user without interacting with the request URL directly. If the result of block 1014 is NO, then Snippet or Callback is requested, and block 1016 merges and manipulates the response from the Host App API per the OVR Data file (and performs the Snippet/Callback Logic— FIG. 11). Next, block 1018 sends the response to the Client Test Develop. Logic 20 and the logic exits.

Figure 11:
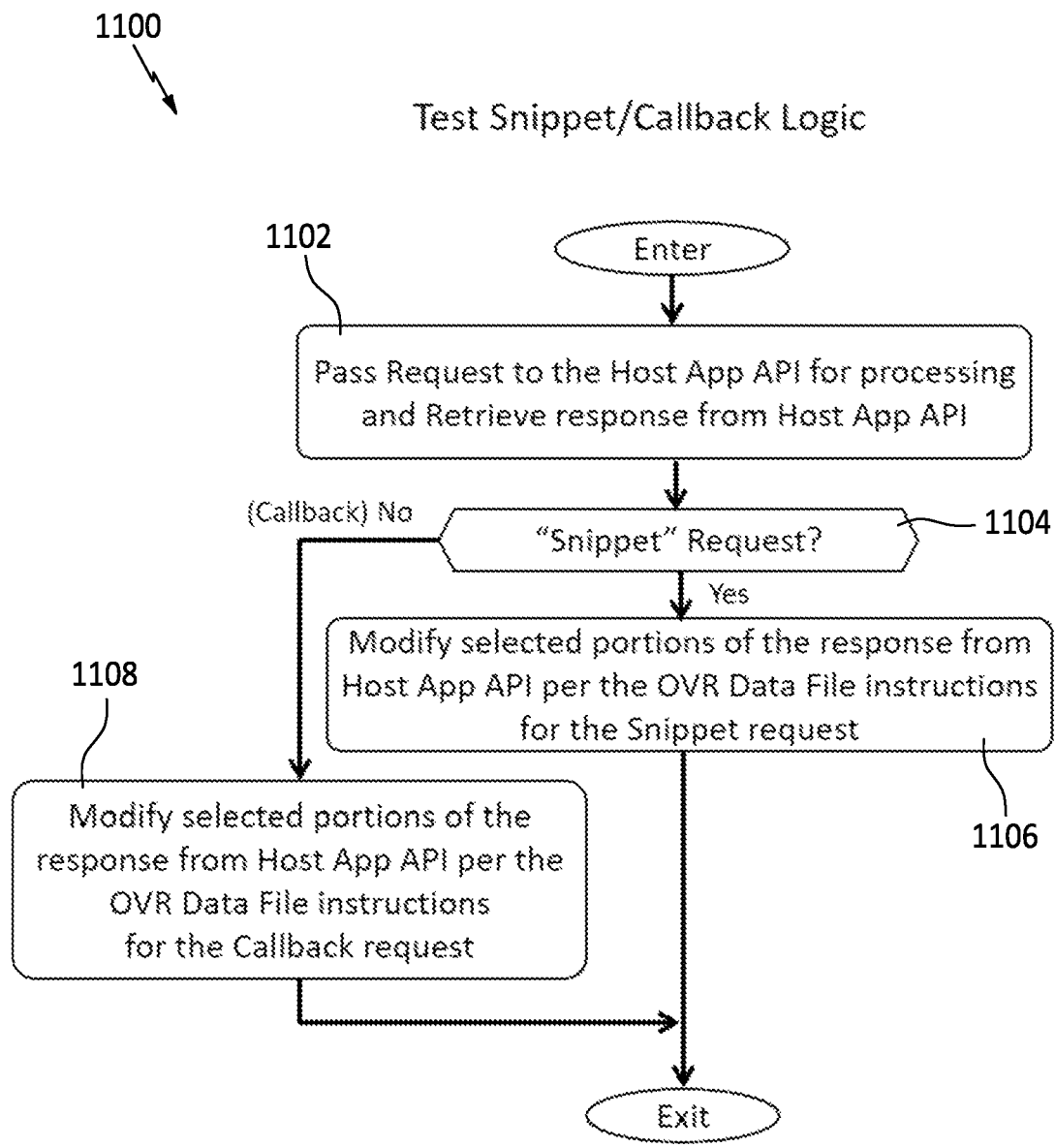
FIG. 11 is a flow diagram of one embodiment of a Test Snippet Callback Logic within the Test API Response Logic of FIG. 10, in accordance with embodiments of the present disclosure.

Referring to FIG. 11, a flow diagram 1100 illustrates one embodiment of a process or logic for implementing the Test Snippet/Callback Logic within the Test API Response Logic of FIG. 10. The process 1100 begins at block 1102, which passes the request to Host App API for processing and retrieves response from the Host App API. Next, block 1104 determines if the request is a "snippet" request. If Yes, then "snippet" was requested and block 1106 modifies selected portions of the response from the Host App API per instructions in the Override (OVR) data file and the logic exits. For example, Test Processing Logic may request the file from the request URL and combined with the ruleset in the Override (OVR) data file modifies N number of data points (or end points) in the response. If the result of block 1104 is NO, the request is a "callback" request, and block 1108 modifies selected portions of the response from the Host App API per instructions in the Override (OVR) data file and the logic exits.

Callbacks work in a similar way to the "full" and "snippet" features in that they enable users to customize proxy requests through the Test Logic. In that case, the override (OVR) data file contains instructions to execute a series of additional requests, callback functions or data manipulation executions. The Test Logic provides an interface that can execute functions safely within its borders. A user can do things like: (i) run a function that modifies time based variables in a response; (ii) run a function that executes a Postman® collection (a series of requests) that can modify a user's state before returning the response; (iii) execute programmatic changes in a response like modifying the time or value of a request to simulate live playback/metadata for each subsequent response. In that case, the Test Logic or the Test Logic or the Test Logic does not allow anything to be executed. The Test Logic implements a core set of functions and documents the API so users can execute those and provide inputs to from their Test configs. Each callback may be different, but below is a Callback example.

In particular, for the Callback behavior, the Test Logic requests the file from the request URL and, combined with the ruleset in the Override (OVR) file, modifies the response or behavior of the response. For example, the Callback override may contain the arguments (or variables) for a SUM function. In that case, the Test Processing Logic may use those arguments and invoke a method then based on the ruleset and modify the response before returning to the user.

In another example, when integration testing between a Host App (e.g., streaming App1) and a Second App (e.g., streaming App2) Content API's is performed, the present disclosure is able to interrupt the flow from Host App->Test Logic->Host App API and execute a series of HTTP requests that: (i) got a Second App token; (ii) logged into Second App's API; (iii) made a request to Second App's Content API; (iv) proxied the original request to Host App Content API; (v) merged the Host App and Second App responses and created a data transform layer. In the above example, the Test config included the login credentials and query information that was used in the Callback. Tokens or token services provide encrypted information related to a given user session for the Host App, including a user state, such as logged in, location, partner, active profile, device information, and the like, and are often in the header of a request.

Below is an example description of one embodiment of the present disclosure for making a request from the Host App after the Host App API Config file has been hydrated. When the Host App makes a request to an endpoint that was modified (hydrated) by the Test Processing Logic, in some embodiments, it may perform the below steps. In some examples or embodiments described herein, the labels or terms "visionware" or "VW" may be used to reference the Test Logic or a path thereto.

(1) Send a request to the Test Processing Logic, such as the following example URL: "https://someDomain.com/path/method?requestUrl=https:/someurl.com&projectConfig Url=https://config.com/test.json"

(2) Test Processing Logic 50 may break the URL into 3 parts: (a) The "domain and path" (located before the "?" symbol), where the path is a reference to the command or query or method, such as the query "getCollection", in this example: "https://someDomain.com/path/method"; (b) the request URL (located after the "?" symbol). The original URL that existed in the Original Host App API Client Config. file. In some embodiments, this is templated and only filled in at request time by the Client Host API Request; in this example: "requestUrl=https:/someurl.com"; and (c) The Test Config File URL address (located after the "&" symbol), which is the Test Config that was used when hydrating the Client API; "projectConfigUrl=https://config.com/test.json"

(3) The Test Processing Logic fetches the Test Config file based on the selected test;

(4) The Test Processing Logic looks inside (or parses) the Test Config File for an entry that matches parts of the hydrated Host API request URL and path, including: (a) whether the Test API Config file has a "getCollection" entry (for this example); (b) whether the Selected Test have a Unique ID within "getCollection" that matches the incoming request URL and, if so, the Test Processing Logic will pull "someurl.com", such as "/home/slug/home" from the Host App Request URL and then look inside of "getCollection" in the Test Config file for "/home/slug/home."

(5) If the Test Processing Logic finds a match, it will make a request to get the resource found at "getCollection ["/home/slug/home"].url (in this example), which is a URL pointing to mock data or behavior data. If no match is found, the Test Processing Logic did not modify that Request URL and the request will be sent to the backend service as usual and the response sent directly back to the Host App and handled as usual, without alteration, as if no test was being performed.

(6) The Test Processing Logic inspects the "Behavior type" property or field at "getCollection["/home/slug/home"].type (in this example) to tell it how to behave, e.g., Full, Snippet, or Callback behavior type. In particular, "Full" sends the mock data directly back to the client. "Snippet" fetches the data from the Request URL above and fetches the mock data; the mock data, which is actually a set of instructions, tells Test Processing Logic how to modify the response from the backend service resource found from the requestUrl; and "Callback", which is a combination of the above two types (Full and Snippet). In particular, if can inject data, make additional requests to modify user state, and do any other request.

(7) Then Test Processing Logic returns the data back to the Host App and the user in a format the Host App and user will recognize.

FIGS. 13 to 18 provide example explanations for certain tests run by the Test Logic of the present disclosure. Other tests may be used if desired.

Figure 13:
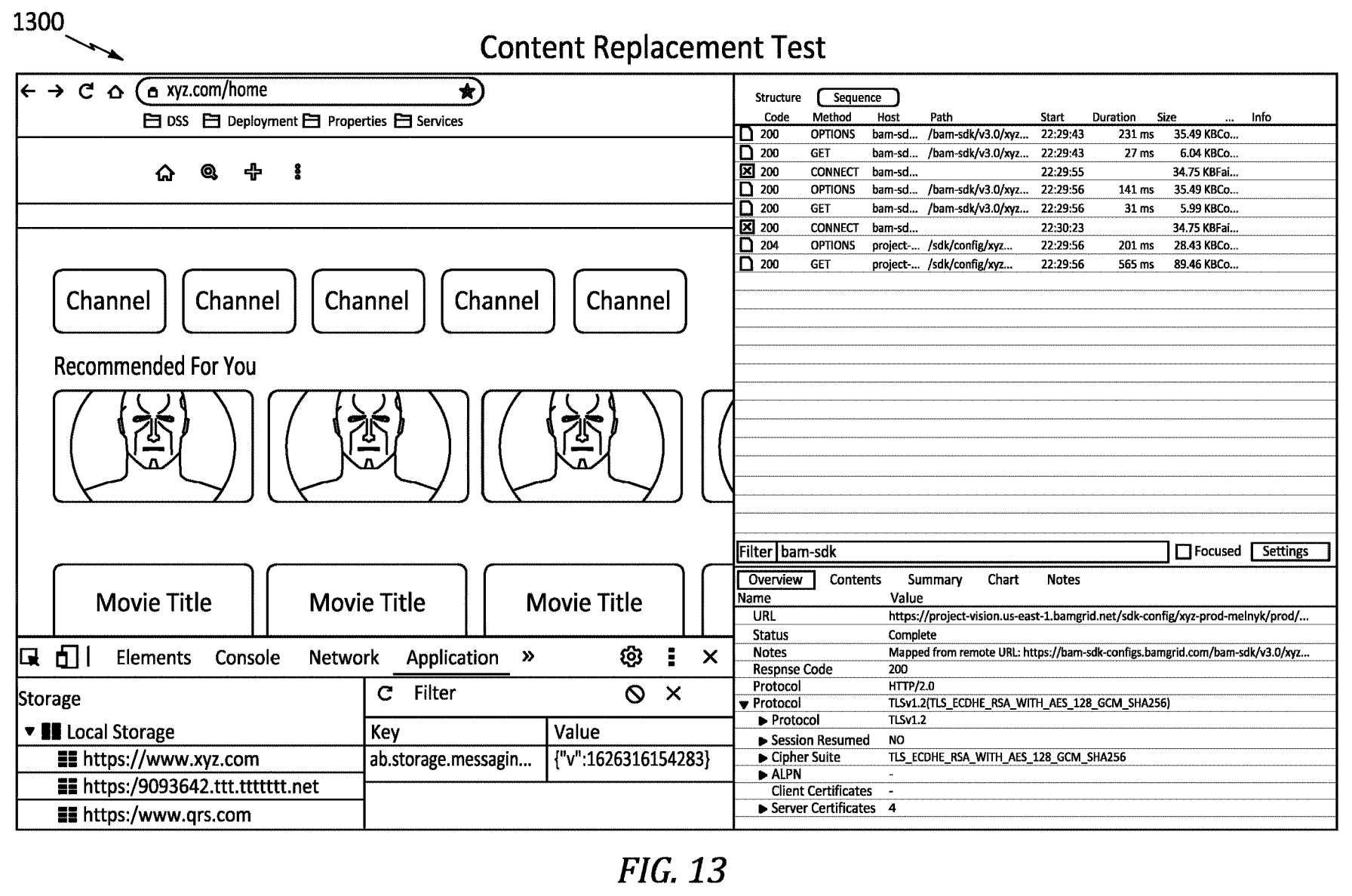

In particular, referring to FIG. 13, a screenshot 1300 of the Content Replacement Test is shown. In particular, the ability to replace full or individual parts of a data set when requesting data from the Host App API (or Content API). This could be any backend service that provides metadata that drives the UI of a host application. The screenshot below shows the Client Test Development Logic and the Server Test API Processing Logic Test logic (FIG. 1) described herein, or collectively Test Logic, replacing some of the data on the Host App production website without a developer deploying code. The right side of the screenshot shows a proxy tool called Charles which was used to proxy the original Host API request during a "bootstrap" process through the Server Test Processing Logic, resulting in subsequent requests being routed through the Server Test Processing Logic as well.

Figure 14:
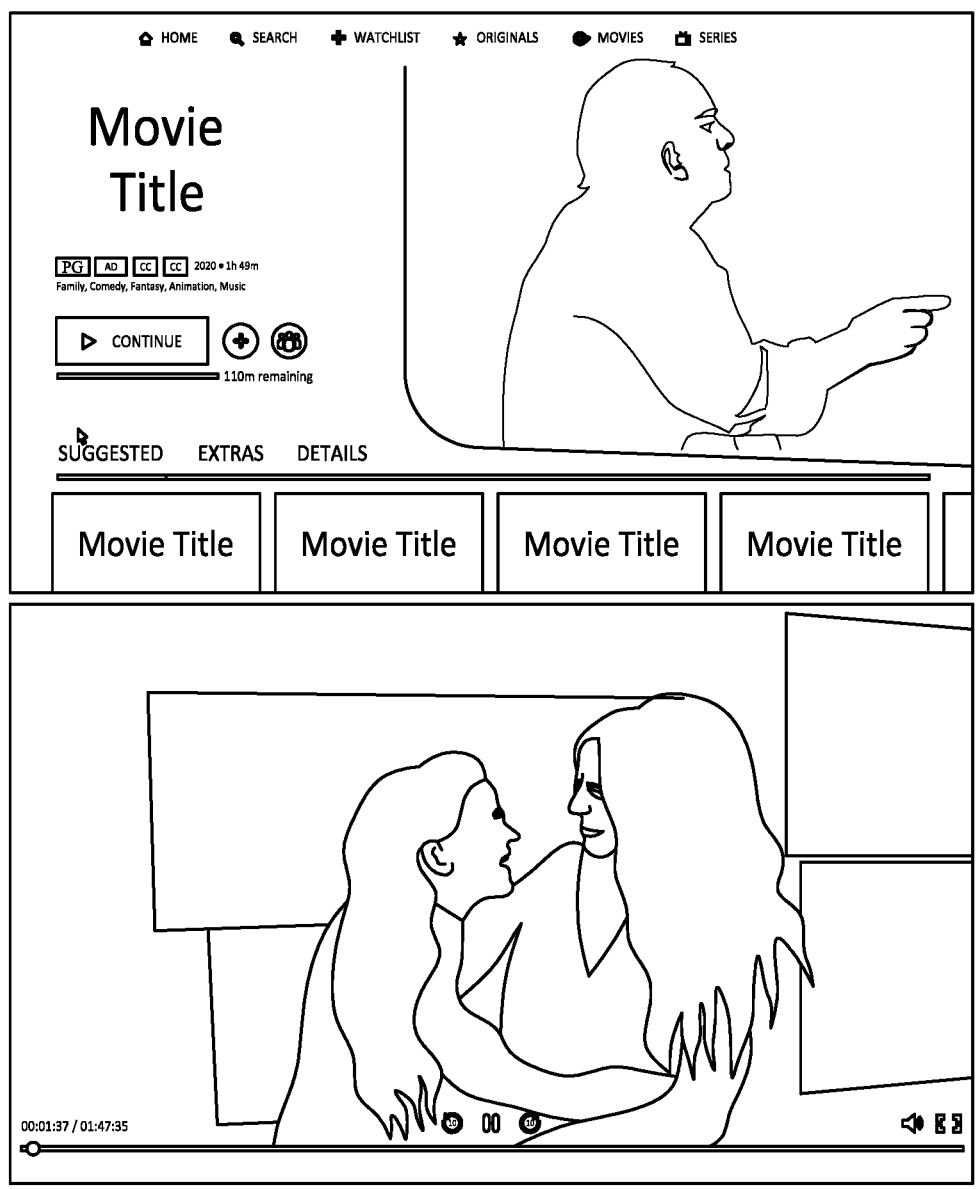
FIG. 14 is a screen illustration showing a response of the Client Host App to a Metadata and Playback URL Replacement Test performed by the system and method of the present disclosure, in accordance with embodiments of the present disclosure.

Referring to FIG. 14, a screenshot 1400 of the Metadata and Playback URL Replacement Test is shown. In particular, the screenshots illustrate a movie's metadata being overwritten and nested data points being used for future requests when playback is initiated causing the video player to playback entirely different content for testing purposes. This is achieved with a single Test configuration file.

Figure 15:
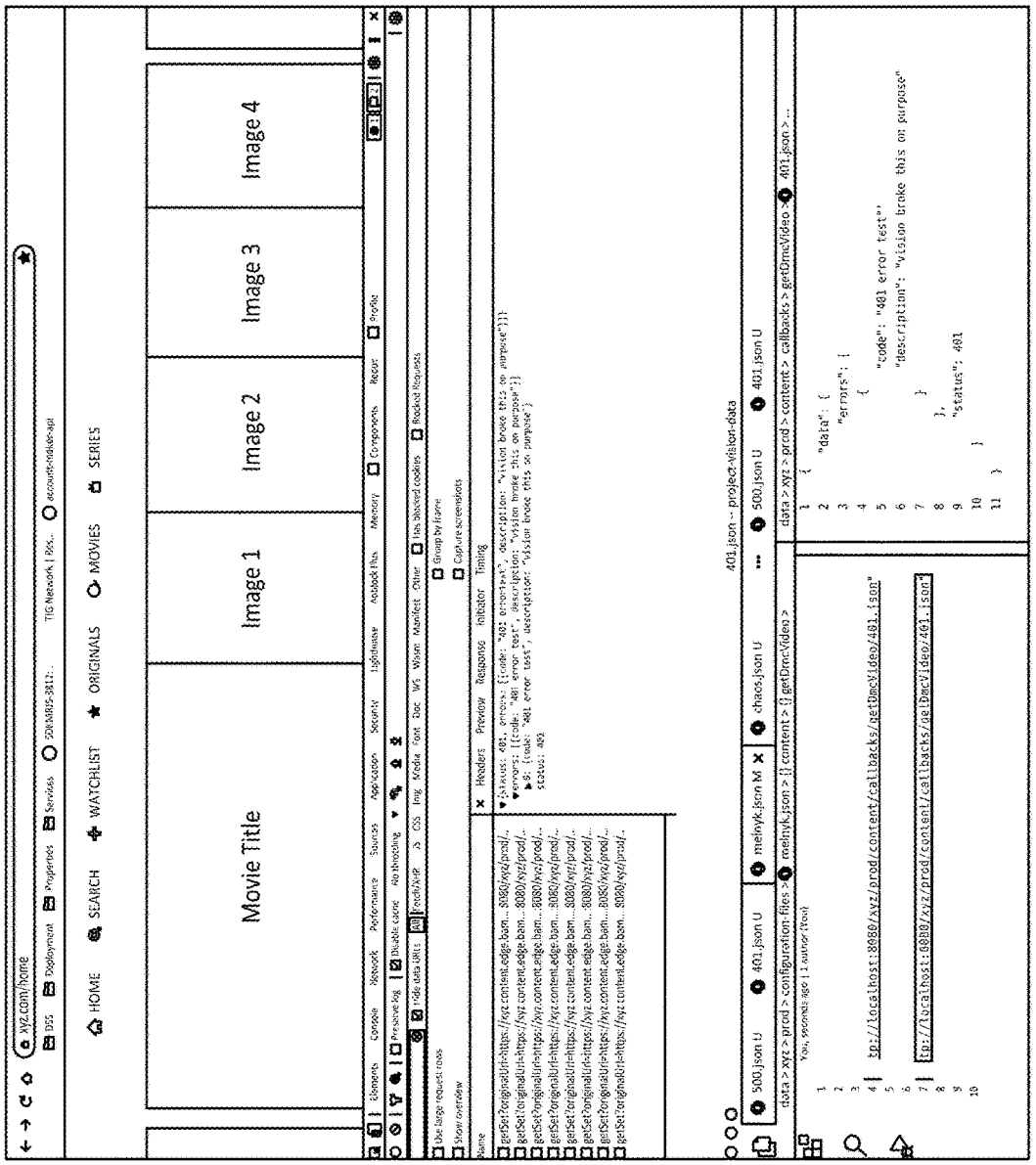
FIG. 15 is a screen illustration showing a response of the Client Host App to a Chaos Test performed by the system and method of the present disclosure, in accordance with embodiments of the present disclosure.

Referring to FIG. 15, a screenshot 1500 of the Chaos Test is shown. In particular, a single Test configuration file may target many, requests and replace the responses with valid HTTP error codes, e.g., developer.mozilla.org/en-US/docs/Web/HTTP/Status, for the client. This allows clients to not only manufacture one or many custom or standard errors from their backend services but also consume the proper HTTP status code so their device reacts appropriately.

Figure 16:
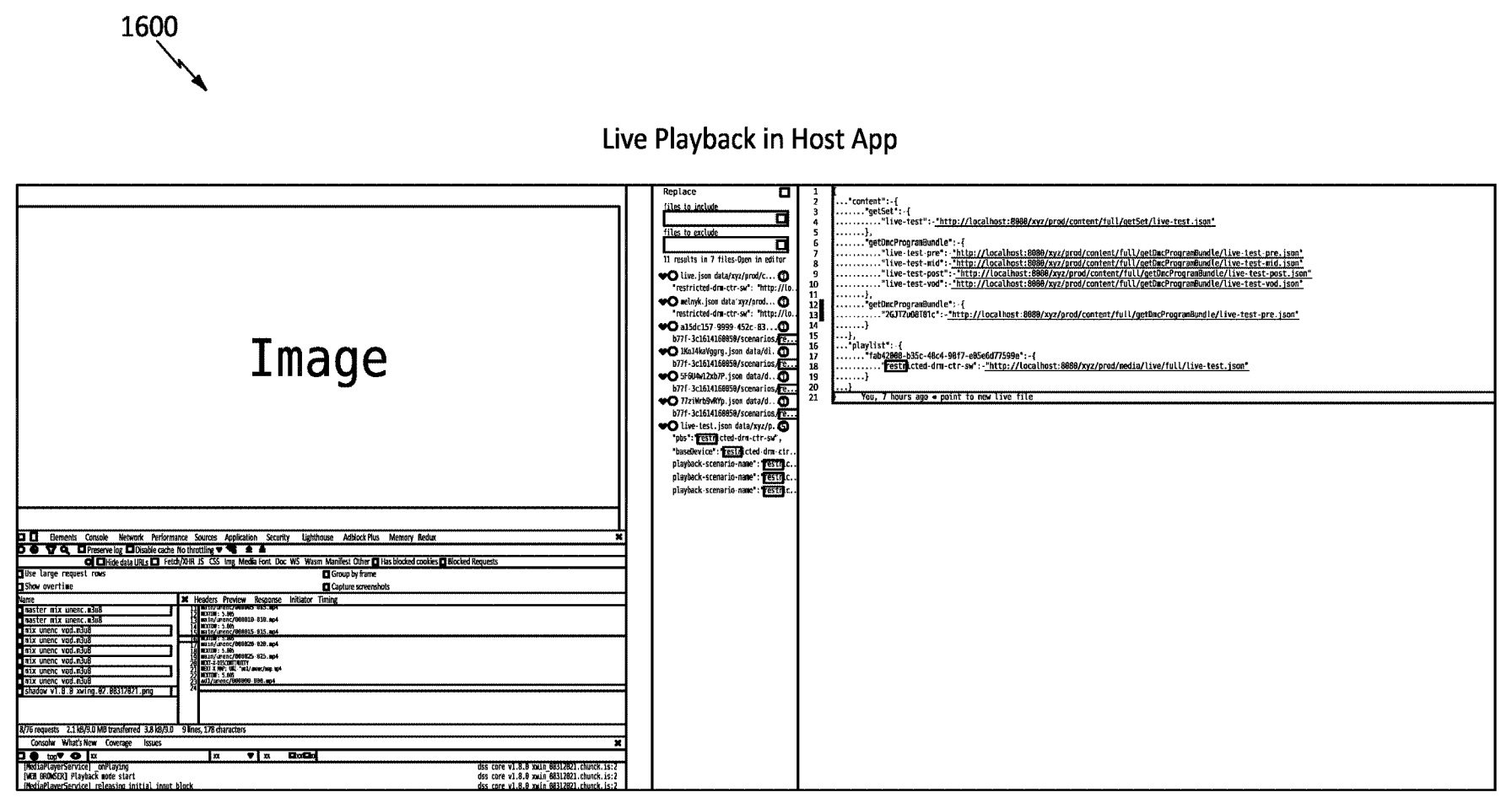

Referring to FIG. 16, a screenshot 1600 of Live Playback in Host App (e.g., D+ streaming service) Test is shown. In particular, the Test Logic provides an interface to graph nested relationships, which is how the Playback replacement above was accomplished. With the present disclosure, the user can test live playback on the Host App before any developers start to implement it by graphing content requests to playback requests, as seen in the screenshot. More specifically, a content request's mock data has a reference to the same "playlist" node in the configuration file. When playback is initiated using the content response's metadata, the player will make a request with a URL that matches the Unique ID of the playlist node in the screenshot which is routed through the Server Test API Processing Logic (or Server Test Logic) and ultimately surfaces a mock live stream for testing. The left panel of the screenshot shows Chrome's dev tools and highlights a video playlist response which does not have an EXT-X-ENDLIST tag, indicating that the video is "LIVE", effectively tricking the player into playing a LIVE stream despite not yet implementing the full underlying flow to support live playback.

Figure 17:
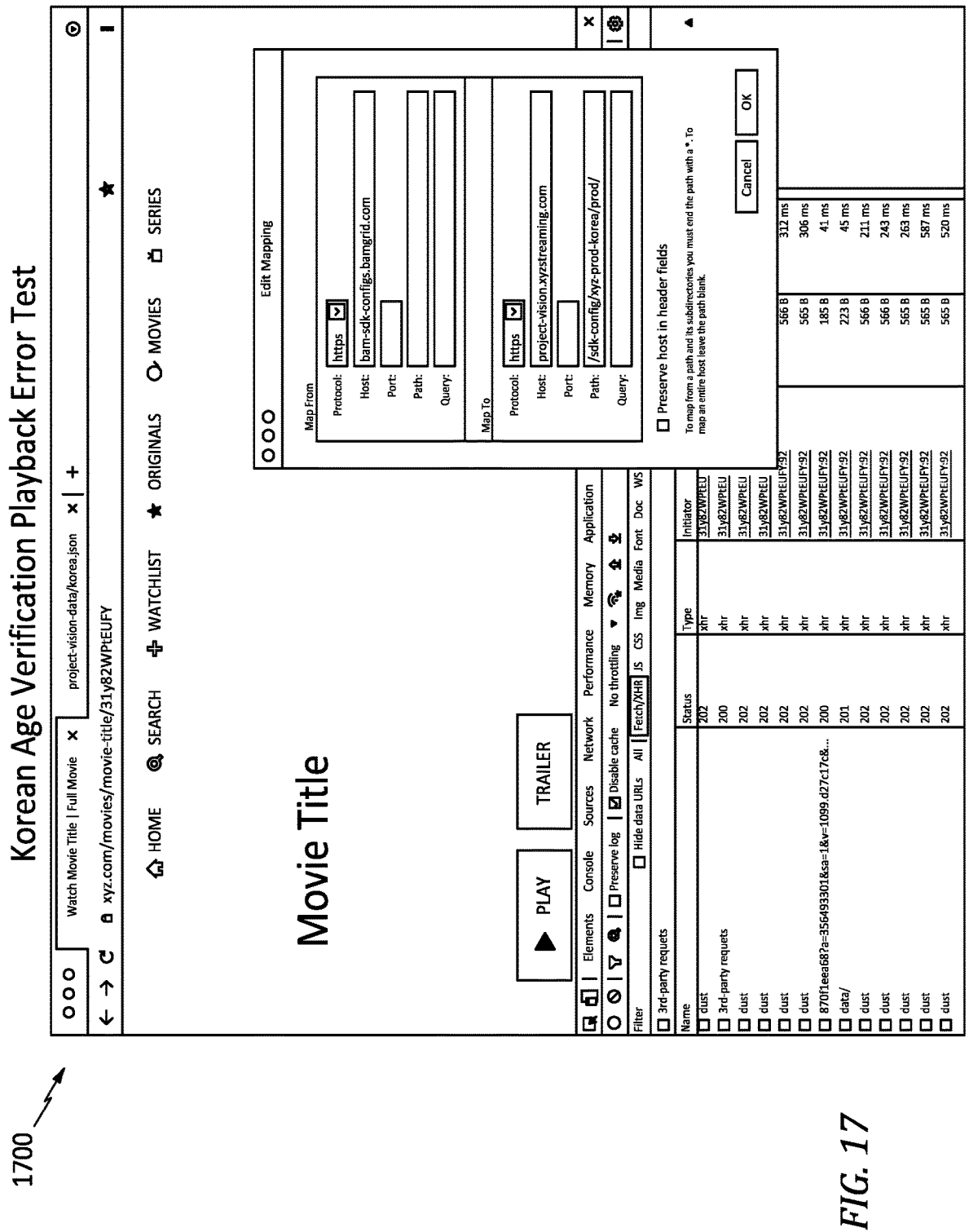
FIG. 17 is a screen illustration showing a response of the Client Host App to a Korean Age Verification Playback Error Test performed by the system and method of the present disclosure, in accordance with embodiments of the present disclosure.

Referring to FIG. 17, a screenshot 1700 of Korean Age Verification Playback Error Test is shown. In particular, simulating errors that are location or age related are difficult and time consuming. However, the Client Test Development Logic and the Server Test API Processing Logic Test logic (FIG. 1) described herein, or collectively Test Logic, provides a simple-to-use but powerful framework allowing users to test and develop their Application code on top of complete, incomplete or non-existent services. This particular feature was difficult for developers to build against because: (1) The service that throws this error did not yet exist; (2) Simulating a user physically being in Korea is not easy; (3) Simulating a user's age based error was not possible at the time (until the service was complete); and (4) The Host App did not yet surface the correct text or error keys for clients to capture and key off of to build their UI. However, the Test Logic described herein is able to simulate this error on any user's account allowing teams to build the UI around the expected data contract with the back end service team and use that for testing until the service is complete, thereby, dramatically reducing development thrashing and the time to complete the UI work.

Figure 18:
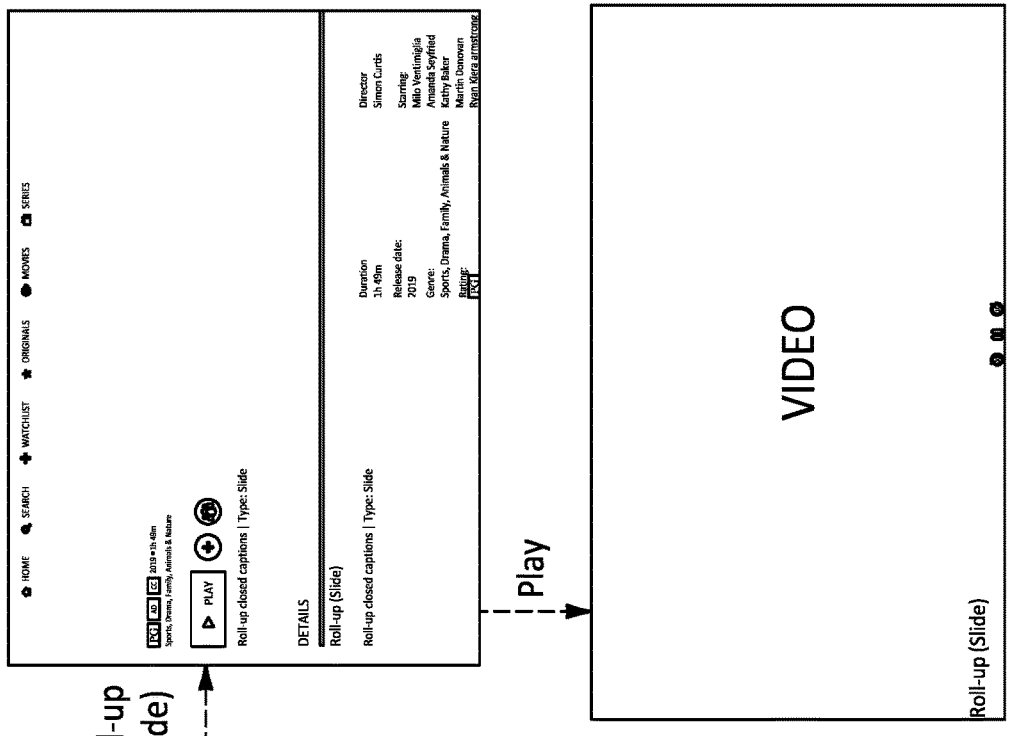
FIG. 18 is a screen illustration showing a response of the Client Host App to a Total Takeover Test performed by the system and method of the present disclosure, in accordance with embodiments of the present disclosure.
Figure 18:
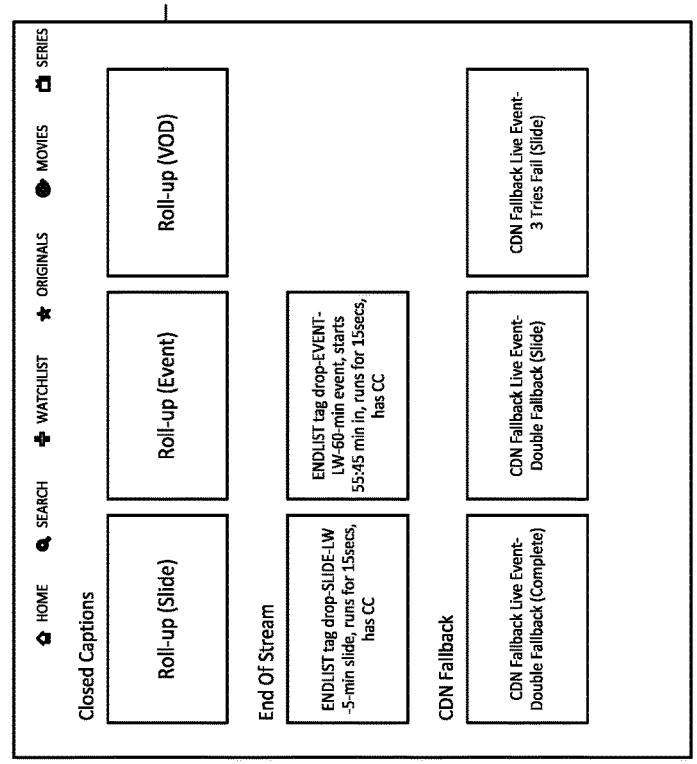

Referring to FIG. 18, a screenshot 1800 of Total Takeover Test is shown. In that test, the Test Logic has executed a config file that has taken over the entire Host App landing page and replaced it by clickable links for: Closed Captions: Rollup (Slide), Rollup (Event), and Roll-up (VOD); End of Stream: ENDLIST tag drop—Slide—LW—5 min slide, runs for 15 seconds has CC, and ENDLIST tag drop—Event—LW—60 min event, runs for 15 seconds has CC; and CDN Fallback: CDN Fallback Live Event—Double Fallback (Complete), CDN Fallback Live Event—Double Fallback (Slide), and CDN Fallback Live Event—3 Tries Fail (Slide). It also shows a sample screen shot when the user selects Roll-up (Slide) button, which displays a details page for Roll-up (Slide) with a Play button, and then shows a sample screen shot when the user selects the Play button, which displays an image of the Today Show.

Another test shown in the Test List is "up Next Content Replacement. In that test, users needed a way to manually test the "Up Next" feature of a content viewing app, which typically is driven by an individual user's profile settings and history. The Test Logic provides a way to force the next content response to be static for testing purposes. In some embodiments, the Test Logic may be used to establish a static test case to reliably test metadata and transitions between two films or videos accessible by the Host App.

Also, in some embodiments, a developer can create their own test configuration files and be added to the drop down list of tests, if desired, and may be created through a user interface and database, if desired. In particular, in one process, users may start by cloning the repository, then create a new configuration file in the directory that matched the partner and environment of choice, then populate the path and filename of the response. Then create the response in the specified path. In some embodiments, the present disclosure may have Test Config URL Generator Logic which produces or generates at least one Config URL, in various different formats, e.g., JS SDK URL, Android SDK URL, iOS SKD URL, Roku SDK URL, and UWP SDK URL. Where SDK may be the same as the Host App.

The system, computers, servers, devices and the like described herein have the necessary electronics, computer processing power, interfaces, memory, hardware, software, firmware, logic/state machines, databases, microprocessors, communication links, displays or other visual or audio user interfaces, printing devices, and any other input/output interfaces, to provide the functions or achieve the results described herein. Except as otherwise explicitly or implicitly indicated herein, process or method steps described herein may be implemented within software modules (or computer programs) executed on one or more general purpose computers. Specially designed hardware may alternatively be used to perform certain operations. Accordingly, any of the methods described herein may be performed by hardware, software, or any combination of these approaches. In addition, a computer-readable storage medium may store thereon instructions that when executed by a machine (such as a computer) result in performance according to any of the embodiments described herein.

In addition, computers or computer-based devices described herein may include any number of computing devices capable of performing the functions described herein, including but not limited to: tablets, laptop computers, desktop computers, smartphones, smart TVs, set-top boxes, e-readers/players, and the like.

Although the disclosure has been described herein using exemplary techniques, algorithms, or processes for implementing the present disclosure, it should be understood by those skilled in the art that other techniques, algorithms and processes or other combinations and sequences of the techniques, algorithms and processes described herein may be used or performed that achieve the same function(s) and result(s) described herein and which are included within the scope of the present disclosure.

Any process descriptions, steps, or blocks in process or logic flow diagrams provided herein indicate one potential implementation, do not imply a fixed order, and alternate implementations are included within the scope of the preferred embodiments of the systems and methods described herein in which functions or steps may be deleted or performed out of order from that shown or discussed, including substantially concurrently or in reverse order, depending on the functionality involved, as would be understood by those reasonably skilled in the art.

It should be understood that, unless otherwise explicitly or implicitly indicated herein, any of the features, characteristics, alternatives or modifications described regarding a particular embodiment herein may also be applied, used, or incorporated with any other embodiment described herein. Also, the drawings herein are not drawn to scale, unless indicated otherwise.

Conditional language, such as, among others, "can," "could," "might," or "may," unless specifically stated otherwise, or otherwise understood within the context as used, is generally intended to convey that certain embodiments could include, but do not require, certain features, elements, or steps. Thus, such conditional language is not generally intended to imply that features, elements, or steps are in any way required for one or more embodiments or that one or more embodiments necessarily include logic for deciding, with or without user input or prompting, whether these features, elements, or steps are included or are to be performed in any particular embodiment.

Although the invention has been described and illustrated with respect to exemplary embodiments thereof, the foregoing and various other additions and omissions may be made therein and thereto without departing from the spirit and scope of the present disclosure.

What is claimed is:

1. A computer-based method for testing a Host App running on a user device, the Host App communicating with at least one API server using a Host App API configuration request, the Host App API configuration request including a Host App API configuration request URL, the Host App API configuration request URL being part of a Host App Config File, the method comprising:
    selectively hydrating the Host App API Config File by selectively replacing at least one of the Host App API configuration request URLs corresponding to a query in a Test Config File with a hydrated Host App API configuration request URL;
    routing the Host App API configuration request through Test Logic performed by the computer based on the hydrated Host App API configuration request URL, the Test Logic providing a response to the Host App API configuration request based on a behavior type specified in the Test Config File; and
    selecting between at least a snippet, full and callback response based on the behavior type specified in the Test Config File, wherein the snippet feature passes the Host App API configuration request to the API Server and responds to the Host App API configuration request with a modification of the response from the API Server.

2. The method of claim 1, wherein the Test Config File corresponds to a Unique ID in a start-up/hydration request.

3. The method of claim 1, further comprising providing a list of Test Config Files to a user and receiving a test selection from the user which determines the Test Config File.

4. The method of claim 1, further comprising receiving a start-up/hydration request from the user device, wherein the start-up/hydration request comprises a Unique ID, which uniquely identifies the Test Config File.

5. The method of claim 1, further comprising receiving a start-up/hydration request from the user device, wherein the start-up/hydration request comprises an Original Host App API configuration request URL.

6. The method of claim 1, wherein the Hydrated Host App API configuration request URL comprises a test request domain path to the Test Logic, an Original Host App API configuration request URL, and the Test Config File URL.

7. The method of claim 1, wherein the Test Config File further comprises at least one of: an override data file URL, and a Host API Schema associated with the query.

8. The method of claim 1, wherein the Test Config File comprises an override data file, the override data file comprising behavior for the response to the Host App API configuration request.

9. The method of claim 1, wherein the Full behavior type responds to the Host App API configuration request with mock data and does not pass the request to the API Server.

10. The method of claim 1, wherein the Test Config File comprises an override data file, the override data file comprising behavior for the request.

11. The method of claim 1, wherein the Hydrated Config File performs nested operations based on the behavior set up by an override data file corresponding to the Test Config File.

12. The method of claim 1, wherein the selectively hydrating the Host App API Config File comprises selectively replacing a plurality of the Host App API configuration request URLs corresponding to a plurality of queries in the Test Config File with a corresponding plurality of hydrated Host App API configuration request URLs.

13. The method of claim 12, wherein at least one of the plurality of hydrated Host App API configuration request URLs cause the Host App to replace content in the website of the Host App.

14. The method of claim 12, wherein at least one of the plurality of hydrated Host App API configuration request URLs references another of the plurality of hydrated Host App API configuration request URLs.

15. A computer-based method for testing a Host App running on a user device, the Host App requesting content from at least one API server using a Host App API configuration request, the Host App API configuration request including a Host App API configuration request URL, the Host App API configuration request URL being part of a Host App API Config File, the method comprising:
    receiving a start-up/hydration request from the user device, wherein the start-up/hydration request comprises a Unique ID, which uniquely identifies a Test Config File used for testing the Host App; and
    selectively hydrating the Host App API Config File by selectively replacing at least one of the Host App API configuration request URLs corresponding to a query in the Test Config File with a hydrated Host App API configuration request URL;
    routing the Host App API configuration request through Test Logic performed by the computer based on the hydrated Host App API configuration request URL, the Test Logic providing a response to the Host App API configuration request, the response based on a behavior type defined in the Test Config File; and
    selecting between at least a snippet, full and callback response based on the behavior type specified in the Test Config File, wherein the snippet feature passes the Host App API configuration request to the API Server and responds to the Host App API configuration request with a modification of the response from the API Server.

16. The method of claim 15, wherein the start-up/hydration request comprises an Original Host App API configuration request URL.

17. The method of claim 15, wherein the Hydrated Host App API configuration request URL comprises a test request domain path to the Test Logic, an Original Host App API configuration request URL, and the Test Config File URL.

18. The method of claim 15, wherein the Test Config File further comprises at least one of: an override data file URL, and a Host API Schema associated with the query.

19. The method of claim 15, wherein the Test Config File comprises an override data file, the override data file comprising behavior for the response to the Host App API configuration request.

20. The method of claim 15, wherein the Full behavior type further comprises Full, which-responds to the Host App API configuration request with mock data and does not pass the request to the API Server.

21. The method of claim 15, wherein the Test Config File comprises an override data file, the override data file comprising behavior for the request.

22. The method of claim 15, wherein the Hydrated Config File performs nested operations based on the behavior set up by an override data file corresponding to the Test Config File.

23. A computer-based method for testing a Host App running on a user device, the Host App requesting content from at least one API server using a Host App API configuration request, the Host App API configuration request including an Original Host App API config request URL, the Host App API configuration request URL being part of an Original Host App API Config File, the method comprising:
selectively hydrating the Original Host App API Config File, as a Hydrated Host App API Config File, by selectively replacing at least one of the Original Host App API configuration request URLs corresponding to a query in a Test Config File with a Hydrated Host App API configuration request URL;
routing the Host App API configuration request to route through Test Logic performed by the computer based on the Hydrated Host App API configuration request URL, the Test Logic providing a response to the Host App API configuration request, the response based on a behavior type defined in the Test Config File; and
selecting between at least a snippet, full and callback response based on the behavior type specified in the Test Config File, wherein the snippet feature passes the Host App API configuration request to the API Server and responds to the Host App API configuration request with a modification of the response from the API Server.

* * * * *